United States Patent
McFadden et al.

(10) Patent No.: US 9,879,993 B2
(45) Date of Patent: Jan. 30, 2018

(54) ENHANCED BUNDLE ADJUSTMENT TECHNIQUES

(71) Applicant: Trimble Navigation Limited, Sunnyvale, CA (US)

(72) Inventors: Chad McFadden, Lafayette, CO (US); Amit Joshi, Westminster, CO (US); Christian Grässer, Vallentuns (SE); Troy L. Brown, Westminster, CO (US); Shaojun He, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 373 days.

(21) Appl. No.: 14/433,347

(22) PCT Filed: Sep. 30, 2013

(86) PCT No.: PCT/US2013/062679
§ 371 (c)(1),
(2) Date: Apr. 2, 2015

(87) PCT Pub. No.: WO2014/055430
PCT Pub. Date: Apr. 10, 2014

(65) Prior Publication Data
US 2015/0268043 A1    Sep. 24, 2015

Related U.S. Application Data

(63) Continuation-in-part of application No. 13/332,648, filed on Dec. 21, 2011, now Pat. No. 9,182,229.
(Continued)

(51) Int. Cl.
*G01C 11/02* (2006.01)
*G01C 15/00* (2006.01)
(Continued)

(52) U.S. Cl.
CPC .............. *G01C 11/02* (2013.01); *G01C 15/00* (2013.01); *G01C 15/06* (2013.01); *G01C 1/02* (2013.01); *G01C 11/00* (2013.01)

(58) Field of Classification Search
CPC ......... G01C 15/00; G01C 15/06; G01C 11/02
See application file for complete search history.

(56) References Cited

U.S. PATENT DOCUMENTS

| 5,077,557 A | 12/1991 | Ingensand |
| 5,432,712 A | 7/1995 | Chan |

(Continued)

FOREIGN PATENT DOCUMENTS

| WO | WO 2012/088413 A1 | 6/2012 |
| WO | WO 2014/055428 A2 | 4/2014 |

(Continued)

OTHER PUBLICATIONS

International Preliminary Report on Patentability (IPRP) prepared by the International Bureau for PCT International Patent Application No. PCT/US14/43721, dated Dec. 30, 2015; 6 pages.

(Continued)

*Primary Examiner* — Bryan Bui
(74) *Attorney, Agent, or Firm* — Swanson & Bratschun, L.L.C.

(57) ABSTRACT

Novel tools and techniques that can be used to enhance the effectiveness of photogrammetric tools, such as bundle adjustment. One set of techniques can include a photo-observable backsight operation, in which a position of target point can be observed non-photographically, and this observed position can be used to constrain a pixel coordinate location of the same target point in a bundle adjustment operation. Using another technique, a photo-observable check shot operation, the observed position of another target point can be used to verify the validity of a bundle adjust- (Continued)

ment calculation. Such techniques can be used together or separately.

19 Claims, 21 Drawing Sheets

Related U.S. Application Data

(60) Provisional application No. 61/710,486, filed on Oct. 5, 2012, provisional application No. 61/426,566, filed on Dec. 23, 2010.

(51) Int. Cl.
*G01C 15/06* (2006.01)
*G01C 1/02* (2006.01)
*G01C 11/00* (2006.01)

(56) References Cited

U.S. PATENT DOCUMENTS

| | | |
|---|---|---|
| 5,512,905 A | 4/1996 | Nichols et al. |
| 5,642,285 A | 6/1997 | Woo et al. |
| 5,646,844 A | 7/1997 | Gudat et al. |
| 5,929,807 A | 7/1999 | Viney et al. |
| 6,034,722 A | 3/2000 | Viney et al. |
| 6,084,510 A | 7/2000 | Lemelson et al. |
| 6,144,308 A | 11/2000 | Dunne |
| 6,147,598 A | 11/2000 | Murphy et al. |
| 6,237,235 B1 | 5/2001 | Kaschke et al. |
| 6,282,362 B1 | 8/2001 | Murphy et al. |
| 6,463,374 B1 | 10/2002 | Keller et al. |
| 6,859,269 B2 | 2/2005 | Ohtomo et al. |
| 6,873,407 B2 | 3/2005 | Vogel |
| 7,145,648 B2 | 12/2006 | Vogel |
| 7,149,366 B1 | 12/2006 | Sun |
| 7,339,611 B2 | 3/2008 | Marold et al. |
| 7,374,140 B2 | 5/2008 | Crain et al. |
| 7,526,384 B2 | 4/2009 | MacIntosh et al. |
| 7,541,974 B2 | 6/2009 | Scherzinger |
| 7,543,780 B1 | 6/2009 | Marshall et al. |
| 7,611,105 B1 | 11/2009 | Carazo |
| 7,619,561 B2 | 11/2009 | Scherzinger |
| 7,646,339 B2 | 1/2010 | Green et al. |
| 7,697,127 B2 | 4/2010 | Glimm et al. |
| 7,719,467 B2 | 5/2010 | Norda et al. |
| 7,940,211 B2 | 5/2011 | Scherzinger |
| 7,978,128 B2 | 7/2011 | Scherzinger |
| 7,991,575 B2 | 8/2011 | Vogel et al. |
| 8,024,144 B2 | 9/2011 | Kludas et al. |
| 8,125,379 B2 | 2/2012 | Allison |
| 8,229,166 B2 | 7/2012 | Teng et al. |
| 8,285,512 B2 | 10/2012 | Vogel et al. |
| 8,348,166 B2 | 1/2013 | Hanson |
| 8,351,686 B2 * | 1/2013 | Graesser ............... G01C 15/06 348/142 |
| 8,416,130 B2 | 4/2013 | Scherzinger |
| 8,427,632 B1 | 4/2013 | Nash et al. |
| 8,625,086 B2 | 1/2014 | Vogel et al. |
| 8,629,905 B2 | 1/2014 | Svanholm |
| 8,633,588 B2 | 1/2014 | Lin et al. |
| 8,754,805 B2 | 6/2014 | Wang et al. |
| 8,897,482 B2 | 11/2014 | Mein et al. |
| 9,182,229 B2 | 11/2015 | Grasser et al. |
| 9,235,763 B2 | 1/2016 | Joyce et al. |
| 9,247,239 B2 | 1/2016 | He et al. |
| 9,354,045 B1 | 5/2016 | Best |
| 2002/0012071 A1 | 1/2002 | Sun |
| 2003/0137449 A1 | 7/2003 | Vashisth et al. |
| 2003/0218540 A1 | 11/2003 | Cooper et al. |
| 2004/0105090 A1 | 6/2004 | Schultz et al. |
| 2004/0228517 A1 | 11/2004 | Massen |
| 2005/0025313 A1 | 2/2005 | Watchel et al. |
| 2005/0031197 A1 | 2/2005 | Knopp |
| 2005/0057745 A1 | 3/2005 | Bontje |
| 2005/0069195 A1 | 3/2005 | Uezono et al. |
| 2005/0125142 A1 | 6/2005 | Yamane |
| 2006/0017938 A1 | 1/2006 | Ohtomo et al. |
| 2006/0195254 A1 | 8/2006 | Ladetto et al. |
| 2007/0133012 A1 | 6/2007 | Euler |
| 2007/0188601 A1 | 8/2007 | Rohaly et al. |
| 2007/0247457 A1 | 10/2007 | Gustafsson et al. |
| 2007/0297696 A1 | 12/2007 | Hamza et al. |
| 2009/0074254 A1 | 3/2009 | Jamison et al. |
| 2009/0099774 A1 | 4/2009 | Takac et al. |
| 2009/0154793 A1 | 6/2009 | Shin et al. |
| 2009/0220144 A1 | 9/2009 | Mein et al. |
| 2009/0225161 A1 | 9/2009 | Otani et al. |
| 2009/0231574 A1 | 9/2009 | Vogel et al. |
| 2009/0262974 A1 | 10/2009 | Lithopolous |
| 2009/0267827 A1 | 10/2009 | Allison |
| 2010/0157283 A1 | 6/2010 | Kirk et al. |
| 2010/0168949 A1 | 7/2010 | Malecki et al. |
| 2010/0172546 A1 | 7/2010 | Sharp |
| 2010/0174507 A1 | 7/2010 | Vogel et al. |
| 2010/0305857 A1 | 12/2010 | Byrne et al. |
| 2010/0309311 A1 | 12/2010 | Svanholm |
| 2010/0322482 A1 | 12/2010 | Kochi |
| 2011/0007154 A1 | 1/2011 | Vogel et al. |
| 2011/0064312 A1 | 3/2011 | Janky et al. |
| 2011/0075886 A1 | 3/2011 | Ashjaee et al. |
| 2011/0158475 A1 | 6/2011 | Otani et al. |
| 2011/0282578 A1 | 11/2011 | Miksa et al. |
| 2011/0285587 A1 | 11/2011 | Vollath et al. |
| 2011/0290937 A1 | 12/2011 | Salkeld |
| 2012/0026322 A1 | 2/2012 | Malka et al. |
| 2012/0029732 A1 | 2/2012 | Meyer |
| 2012/0093394 A1 | 4/2012 | Li |
| 2012/0101796 A1 | 4/2012 | Lindores |
| 2012/0114229 A1 | 5/2012 | Zhou |
| 2012/0155747 A1 | 6/2012 | Hwang |
| 2012/0163656 A1 | 6/2012 | Wang et al. |
| 2012/0166137 A1 | 6/2012 | Grasser et al. |
| 2012/0174445 A1 | 7/2012 | Jones et al. |
| 2012/0274775 A1 | 11/2012 | Reiffel |
| 2012/0326923 A1 | 12/2012 | Oehler et al. |
| 2012/0330601 A1 | 12/2012 | Soubra et al. |
| 2013/0046525 A1 | 2/2013 | Ali et al. |
| 2013/0161810 A1 | 6/2013 | Lin et al. |
| 2013/0181983 A1 * | 7/2013 | Kitamura ............... G01B 11/24 345/419 |
| 2013/0228645 A1 | 9/2013 | Van Speybroeck et al. |
| 2013/0253822 A1 | 9/2013 | Fortune et al. |
| 2013/0298083 A1 | 11/2013 | Bertoldo et al. |
| 2014/0019179 A1 | 1/2014 | Gosalvez et al. |
| 2014/0081571 A1 | 3/2014 | Briggs et al. |
| 2014/0091481 A1 | 4/2014 | Lin et al. |
| 2014/0146173 A1 | 5/2014 | Joyce et al. |
| 2014/0156219 A1 | 6/2014 | Soubra et al. |
| 2014/0195150 A1 | 7/2014 | Rios |
| 2014/0222246 A1 | 8/2014 | Mohamadi |
| 2014/0375773 A1 | 12/2014 | He et al. |
| 2015/0036888 A1 | 2/2015 | Weisenburger |
| 2015/0276402 A1 | 10/2015 | Grasser et al. |
| 2016/0057920 A1 | 3/2016 | Spiller et al. |
| 2016/0116280 A1 | 4/2016 | Joyce et al. |

FOREIGN PATENT DOCUMENTS

| | | |
|---|---|---|
| WO | WO 2014/055430 A2 | 4/2014 |
| WO | WO 2014/081535 A1 | 5/2014 |
| WO | WO 2014/205277 A1 | 12/2014 |
| WO | WO 2016/032901 A1 | 3/2016 |

OTHER PUBLICATIONS

U.S. Appl. No. 13/685,375; NonFinal Office Action dated Aug. 3, 2015; 20 pages.
U.S. Appl. No. 13/685,375; Notice of Allowance dated Sep. 3, 2015; 10 pages.
U.S. Appl. No. 13/922,772; Notice of Allowance dated Sep. 21, 2015; 20 pages.

(56) References Cited

OTHER PUBLICATIONS

International Search Report and Written Opinion prepared by the U.S. Patent and Trademark Office as International Searching Authority for PCT International Patent Application No. PCT/US13/62674, dated Mar. 10, 2014; 18 pages.
International Search Report and Written Opinion prepared by the U.S. Patent and Trademark Office as International Searching Authority for PCT International Patent Application No. PCT/US13/62679, dated Mar. 28, 2014; 16 pages.
Nasvik, "Site Layout with Robotic Total Stations", Dec. 2003 [retrieved on Jan. 25, 2014]. Retrieved from the Internet<URL:http://www.concreteconstruction.net/Images/Site%20Layout%20with%20Robotic%20Total%20Stations_tcm45-590322.pdf> p. 3, paragraph [0000].
Tahar et al. "UAV-Based Stereo Vision for Photogrammetric Survey in Aerial Terrain Mapping," 2011 International Computer Applications and Industrial Electronics (ICCAIE 2011), Dec. 4, 2011, pp. 443-447.
U.S. Appl. No. 13/332,648; NonFinal Office Action dated Dec. 5, 2014; 83 pages.
U.S. Appl. No. 13/332,648; Notice of Allowance dated Jul. 7, 2015; 44 pages.
U.S. Appl. No. 13/922,772; NonFinal Office Action dated May 28, 2015; 37 pages.
Chinese Patent Application No. 201480035137.9; Office Action dated Jun. 27, 2017; 3 pages, English Translation.
Extended European Search Report for EP-21064568, dated Oct. 17, 2017; 6 pages.
U.S. Appl. No. 14/433,330; NonFinal Office Action dated Oct. 5, 2017; 44 pages.

\* cited by examiner

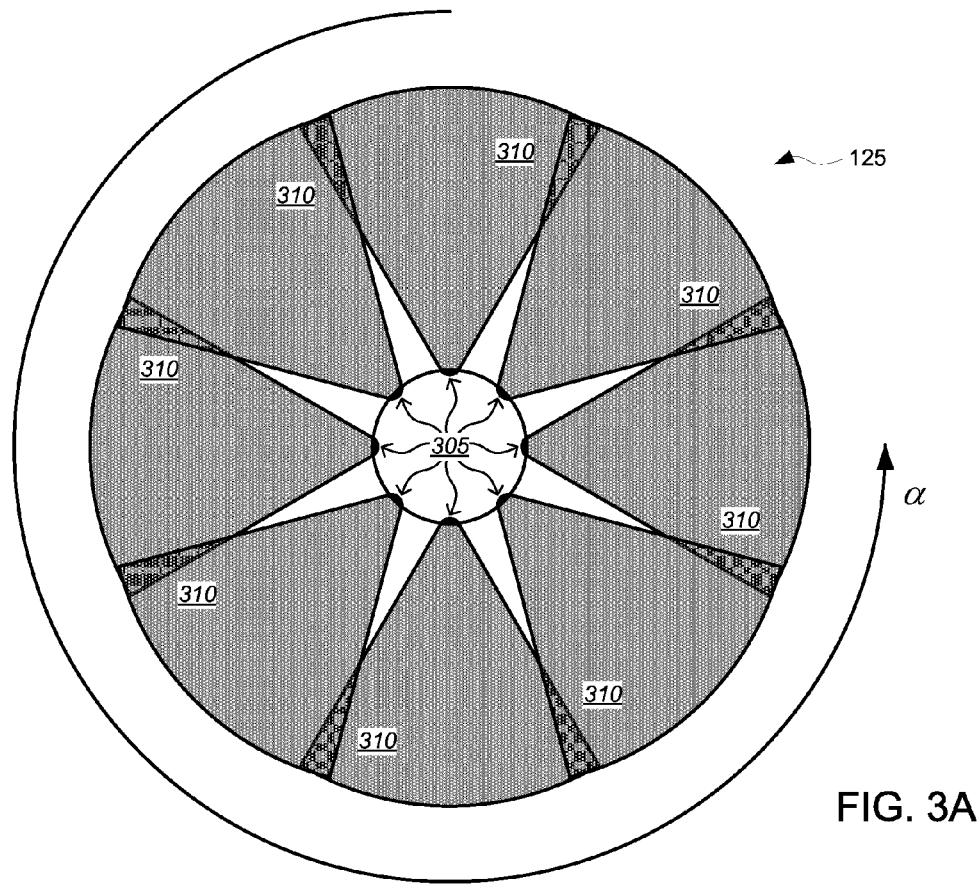
FIG. 3A
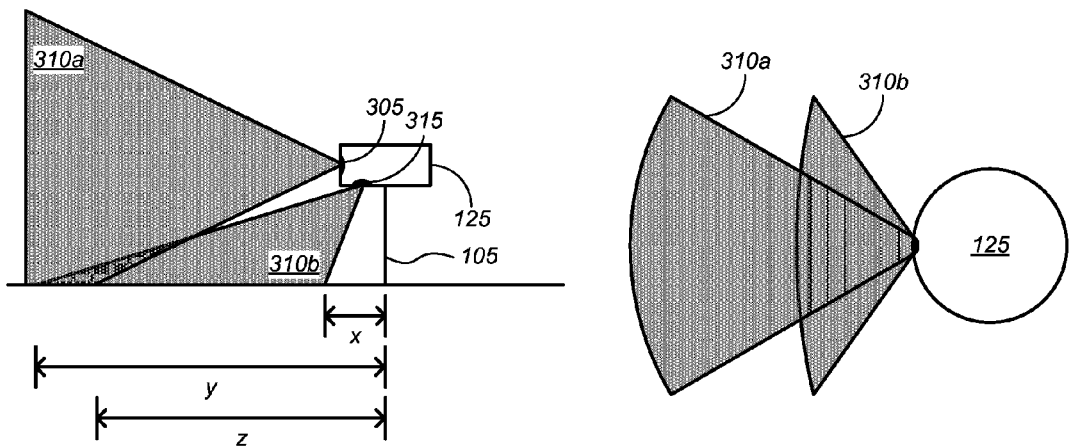
FIG. 3B
FIG. 3C

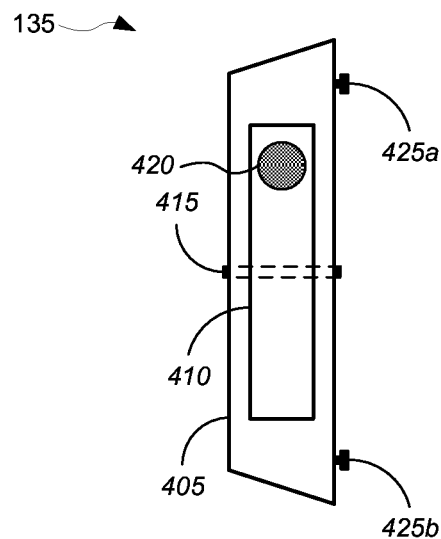
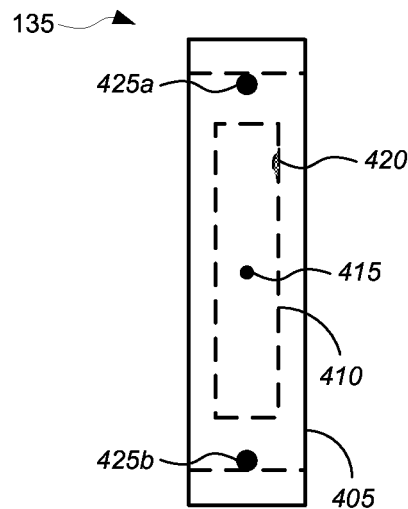
FIG. 4A      FIG. 4B
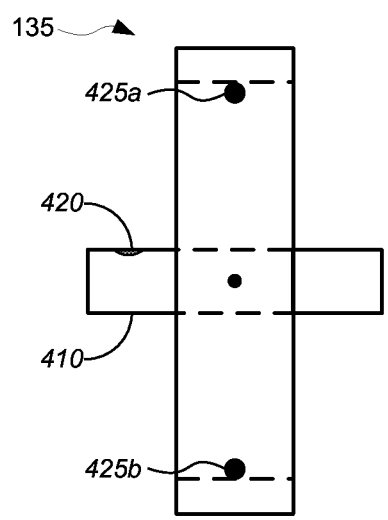
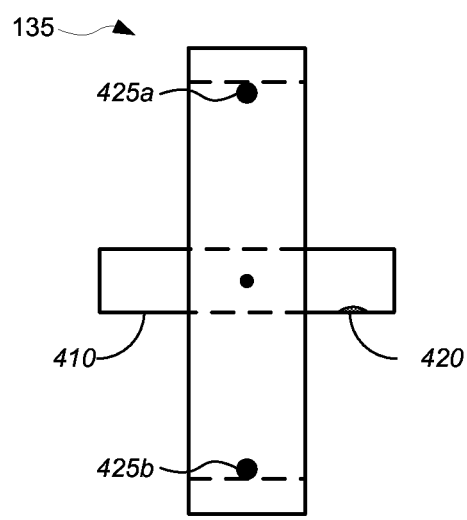
FIG. 4C      FIG. 4D

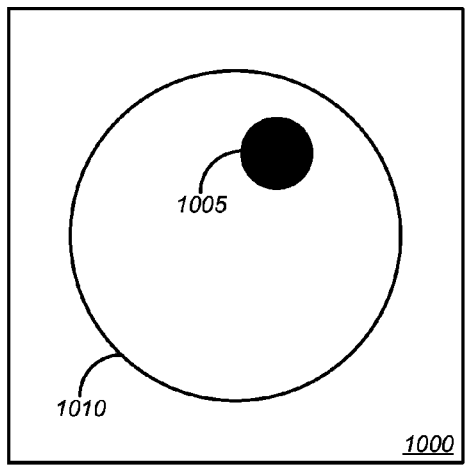
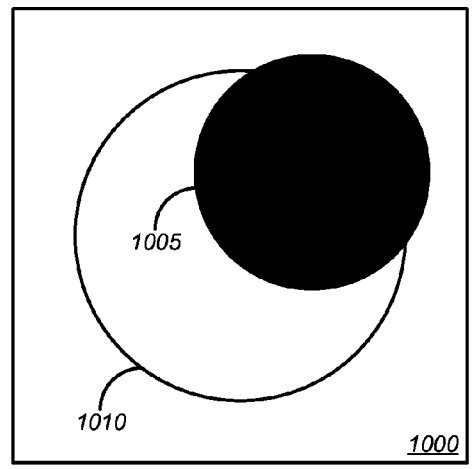
FIG. 10A  FIG. 10B
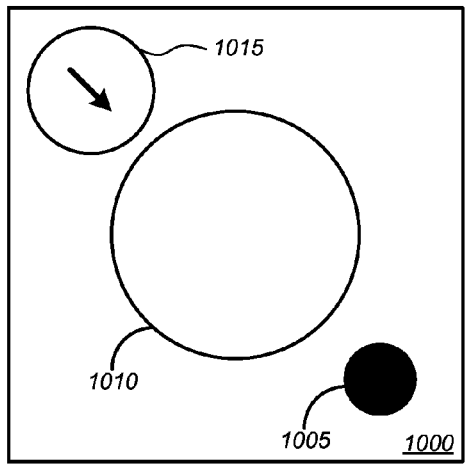
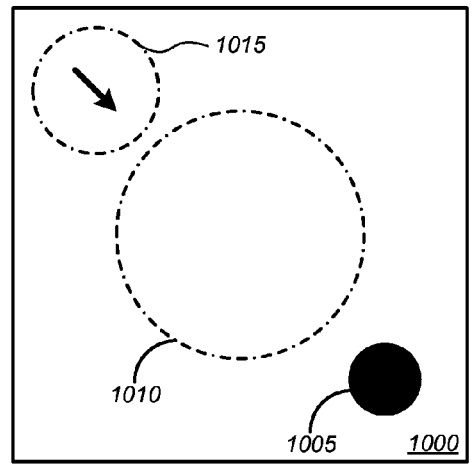
FIG. 10C  FIG. 10D

ENHANCED BUNDLE ADJUSTMENT TECHNIQUES

CROSS REFERENCE TO RELATED APPLICATIONS

This application is a national stage entry, under 35 USC §371, of PCT Application No. PCT/US13/62679, filed Sep. 30, 2013 by Chad McFadden et al. and titled, "Enhanced Bundle Adjustment Techniques", which claims the benefit, under §35 U.S.C. §119(e), of provisional U.S. Patent Application No. 61/710,486, filed Oct. 5, 2012 by Grässer et al. and titled, "Enhanced Position Measurement Systems and Methods", the entire disclosure of which is incorporated herein by reference for all purposes.

This application is also a continuation-in part of U.S. patent application Ser. No. 13/332,648, filed Dec. 21, 2011 by Grässer et al. and titled "Enhanced Position Measurement Systems and Methods", the entire disclosure of which is incorporated herein by reference for all purposes, and which claims the benefit of provisional U.S. Patent Application No. 61/426,566, filed Dec. 23, 2010 by Grässer et al. and titled "Enhanced Position Measurement Systems and Methods," the entire disclosure of which is incorporated herein by reference for all purposes.

The present disclosure also may be related to the following commonly assigned applications/patents:

International Patent Application No. PCT/US13/62674, filed on Sep. 30, 2013 by Grässer et al. and titled, "Enhanced Position Measurement Systems and Methods", the entire disclosure of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to position measurement and surveying, and more particularly, to novel tools and techniques for measuring positions of objects of interest with enhanced efficiency and/or accuracy.

BACKGROUND

Traditionally, the art of surveying (e.g., for laying out property boundaries, construction planning, and/or the like) was performed with an optical theodolite (e.g., a transit) and/or steel measuring tapes. Beginning with a known originating point, a surveyor could identify the locations of any other points of interest by determining an azimuth from the originating point the point of interest using the optical theodolite, and measuring the distance between the two points with the steel tape. In most cases, the surveyor would be accompanied by an assistant, who would place a graduated vertical rod at the point of interest. This would allow the surveyor to more easily locate the point of interest, as well as determine elevation differences between the origination point and the point of interest. Once the location of the point of interest have been determined, the point of interest could be used as an origination point, and the process could be reiterated to locate a new point of interest. This technique is well known and reliable, but it is quite inefficient in comparison with modern techniques.

More recently, the optical theodolite has been replaced, in many instances, by a total station, examples of which are produced by Trimble Navigation Limited, which can include the functionality of an optical theodolite as well as more advanced technology, such as electronic distance measurement functionality, global navigation satellite system ("GNSS") capabilities, and/or the like. In many cases, the total station would be used in conjunction with a vertical rod, such as the rod described above.

While the use of the total station greatly enhances the efficiency of the surveyor's task, several fundamental inefficiencies remain. For example, the process of moving, setting up, and calibrating the total station at each new origination point is nontrivial. Moreover, total stations are expensive, precise instruments. As a result, many job sites can afford relatively few total stations, preventing the efficiencies of scale that can accompany the use of multiple total stations in conjunction. Further, the risk of damage to an expensive total station is high in many construction environments.

Accordingly, there is a need for still further optimization of position measurement tools and techniques, which can be used, inter alia, and surveying and related fields.

BRIEF SUMMARY

Various embodiments provide novel solutions for position measurement, including without limitation solutions that can be used for land surveying and in similar applications. Merely by way of example, a particular set of embodiments provides techniques that can be used to enhance the effectiveness of photogrammetric tools, such as bundle adjustment. One set of techniques can include a photo-observable backsight operation, in which a position of target point can be observed non-photographically, and this observed position can be used to constrain a pixel coordinate location of the same target point in a bundle adjustment operation. Using another technique, a photo-observable check shot operation, the observed position of another target point can be used to verify the validity of a bundle adjustment calculation. Such techniques can be used together or separately.

Some embodiments can take advantage of a greatly enhanced position measurement system that takes the form of a surveying rod (also referred to herein as a "rover"), which can perform both photographic and non-photographic observations. Rather than merely an optical target and glorified measuring stick, the rover provided by certain embodiments exhibits substantial independent functionality, including in some embodiments a GNSS or other positioning device, and can be used with or without a total station or similar device. Different embodiments may include one or more of any number of novel features, including without limitation various sensor packages, imaging packages, and/or control packages. Depending on the particular implementation, these features can be combined in any number of different ways.

The position measurement tools and techniques provided in accordance with various embodiments, therefore, can be used to greatly enhance the efficiency of position measurement tasks, for example by providing a device that is relatively easy to transport, set up, and/or calibrate, especially when compared with a traditional total station. In addition to this enhanced mobility, position measurement tools, including without limitation rovers, can be produced, in accordance with certain embodiments, with substantially less expense than a conventional total station, which renders their widespread use more economically feasible.

The tools provided by various embodiments include, without limitation, not only rovers, but also methods, systems, and/or software products that include such devices and/or facilitate their use. Merely by way of example, a method might comprise one or more procedures, any or all of which are performed by a rover and/or are executed by a computer system in conjunction with a rover. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with a set of embodiments might comprise observing, with a position measurement device, positions of one or more target points non-photographically. The method might further comprise capturing, with an imaging device, the first and second target points in one or more images observed from one or more stations. In some cases, the method comprises correlating, with a computer, the observed position of the first target point with a pixel coordinate location of the first target point in each of the one or more images and/or correlating, with the computer, the observed position of the second target point with a pixel coordinate location of the second target point in each of the one or more images. In some embodiments, the method can include performing, with the computer, a bundle adjustment calculation to orient a mosaic of images comprising the one or more images, where performing the bundle adjustment calculation comprises performing a photo-observable backsight by constraining the bundle adjustment calculation so that a location of the first target point in the oriented mosaic of images corresponds to the observed position of the first target point with respect to the local or global coordinate system to within a specified precision. Alternatively and/or additionally, the method might comprise performing, with the computer, a photo-observable check shot by comparing a location of the second target point in the oriented mosaic of images with the observed position of the second target point with respect to the local or global coordinate system, to ensure that the oriented mosaic of images corresponds to the local or global coordinate system to within a specified precision.

A system in accordance with another set of embodiments might comprise a computer comprising a processor and a non-transitory computer readable medium having stored thereon a set of instructions executable by the processor to perform one or more operations, including without limitation operations in accordance with the methods of other embodiments. Merely by way of example, in one embodiment, the set of instructions might comprise instructions to receive data indicating an observed position of a target point with respect to a global or local coordinate system, and/or instructions to receive a plurality of images comprising the one or more images that include the target point. The instructions might further comprise instructions to correlate the observed position of the target point with a location of the target point in each of the one or more images. In some cases, the set of instructions might include instructions to use a correlation of the observed position of the target point with the location of the target point in each of the one or more images to perform a bundle adjustment calculation that orients a mosaic of images comprising the plurality of images. Examples of techniques that use such a correlation to perform a bundle adjustment can include, without limitation, a photo-observable backsight operation and/or a photo-observable check shot operation.

In some cases, the system might include a position measurement device that observes the position of the target point, with respect to the global or local coordinate system. In other cases, the system might include an imaging device that captures the target point in one or more images observed from one or more stations.

An apparatus in accordance with a set of embodiments might comprise a non-transitory computer readable medium having encoded thereon a set of instructions executable by one or more processors to cause a computer system to perform one or more operations, including without limitation operations in accordance with methods of various embodiments. An exemplary set of instructions, for instance, might comprise instructions to receive, from a position measurement device, data indicating an observed position of a target point; instructions to receive a plurality of images comprising one or more images that include a photographic observation of the target point; instructions to correlate the observed position of the target point with a location of the target point in each of the one or more images; and/or instructions to use a correlation of the observed position of the target point with the location of the target point in each of the one or more images to perform a bundle adjustment calculation that orients a mosaic of images comprising the plurality of images.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3A is a plan view of a position measurement system comprising an image capture subsystem, in accordance with various embodiments.

FIG. 3B is an elevation view of a position measurement system comprising an image capture subsystem, in accordance with various embodiments, and FIG. 3C is a plan view of the position measurement system of FIG. 3B.

FIGS. 4A-4D illustrate an electronic distance measurement system, in accordance with various embodiments.

FIGS. 10A-10D illustrate an electronic display for facilitating position measurements, in accordance with various embodiments.

DETAILED DESCRIPTION OF CERTAIN EMBODIMENTS

Figure 1A:
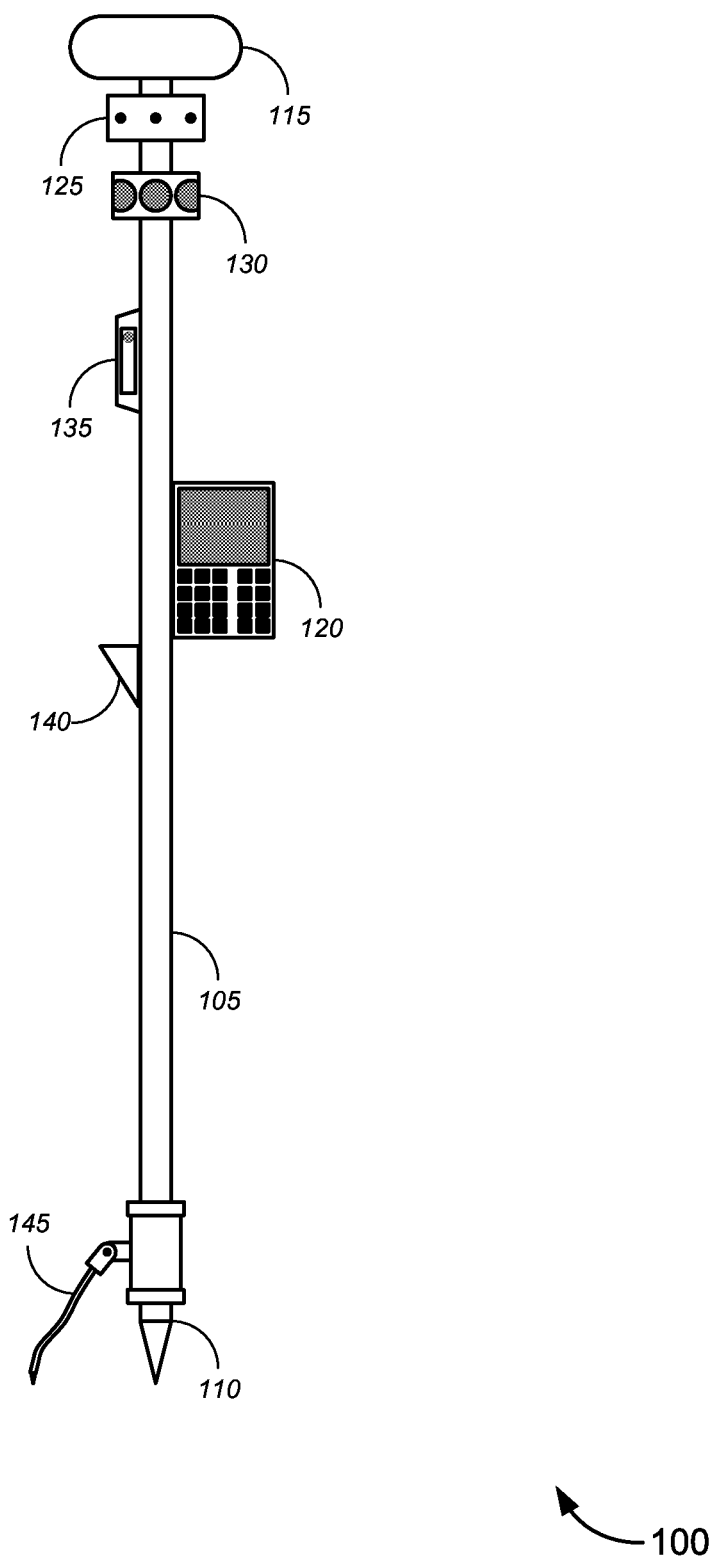
FIGS. 1A and 1B generally illustrate a position measurement system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide novel solutions for position measurement, including without limitation solutions that can be used for land surveying and in similar applications. In general, the field of position measurement is concerned with determining the position, generally (although not always) in three dimensions, of a "target point," (also referred to as an "object point" or a "point of interest") which can be any point in space. Often (but again, not always), a target point will correspond to an "object of interest," which might be a topographic feature, a manmade structure (or component there of, such as the corner of a building, the edge of a wall, the point at which either of these contacts the ground), a property boundary point, a point of significance to a current or proposed construction project, and/or the like. In some cases, a target object might be an optical target that is placed at a target point. Examples of optical targets, some of which are well known, are prisms, discs, spheres, and/or the like, which can be placed in a known position relative to a target point and may be designed to be relatively easy to acquire (e.g., visually and/or electronically) for position measurement purposes. Based on the measurement of the position of the target object and the known position of the target object relative to the target point, the position of the target point can be calculated, often automatically in software. Rovers in accordance with various embodiments can include one or more target objects (such as prisms), sensors to detect (and/or collect data about the position of) target objects, or both.

Merely by way of example, a particular set of embodiments provides a rover that comprises significantly enhanced position measurement functionality. Rather than merely serving as an optical target, a rover provided by certain embodiments might include substantial independent functionality such as GNSS functionality, which can be used with or without a total station. Different embodiments may include one or more of any number of novel features, some of which are described in further detail below, and which can include, without limitation, various combinations of sensor subsystems, image capture subsystems, and/or control subsystems. Other embodiments may also include novel support systems, which can enhance a position measurement system's positional stability and/or ease of use, which in turn can result in more accurate and/or precise measurement, with relatively less effort on the part of the operator. Depending on the particular implementation, these features can be combined in any number of different ways.

The position measurement tools and techniques provided in accordance with various embodiments, therefore, can be used to greatly enhance the efficiency of position measurement tasks, for example by providing a device that is relatively easy to transport, set up, calibrate, and/or use, especially when compared with a traditional total station, while providing significant additional functionality when compared with a traditional surveying rod. In addition to this enhanced mobility, position measurement tools, including without limitation rovers, can be produced, in accordance with certain embodiments, with substantially less expense than a conventional total station, which renders their widespread use more economically feasible.

In a certain embodiment, for example, a rover might comprise a rod (which might be designed to be used in a substantially vertical position), which includes (and/or is coupled with) a sensor subsystem that provides the rover with the ability to track its own position, measure azimuths to target points, and/or measure distance to target points on its own. Alternatively and/or additionally, the rover might include a tilt sensor. Thus, for example, such a rover can be used not only to determine the position of target points where adequate GNSS solutions are available, but also to determine, using a variety of techniques (and/or an optimized synthesis of multiple techniques), positions of target points that fall within a GNSS shadow (e.g., locations where topographic or other features prevent the reception of adequate data to obtain a sufficiently precise GNSS fix). Other embodiments can include an image capture system, which can be used to perform photogrammetric analysis of job sites and/or photogrammetric determination of the locations of points of interest within a job site. In various embodiments, rovers can include any combination of these, and other, features, to provide novel position measurement solutions. As described further herein, various other embodiments can provide additional enhanced functionality to facilitate the job of a surveyor.

For example, in various embodiments, position measurements taken with the rover 100 can be more reliable, since the included sensors can remove operator-induced error and uncertainties. Merely by way of example, a rover employing a tilt sensor is more reliable compared with an operator attempting to center a bubble level without assistance. As another example, measurement of points of interest points" the sensors and image information provided by various embodiments can be more reliable, because the measurement precision can be derived mathematically compared to conventional measurements using steel tape or finding the bearing direction of a two walls intersecting in a corner. In other embodiments, the rover 100 can be easier to set up than a conventional total station, at least partly because the include position measurement systems (such as GNSS systems) can provide the position of the rod itself.

Exemplary Hardware Configurations

FIG. 1A illustrates a position measurement system 100, in accordance with one set of embodiments (referred to in connection with the description of FIG. 1A as a "rover"). It should be noted that while the rover 100 of FIG. 1 includes a combination of many different features, position measurement systems in accordance with other embodiments might omit some or all of these features. Thus, while the illustrated rover 100 is exemplary of certain embodiments, it should not be considered limiting.

The rover 100 comprises a rod 105 having a longitudinal axis, and in many embodiments, the rover 100 is designed so that, in use, the longitudinal axis of the rod 105 will be disposed in a substantially vertical position, with the base portion 110 substantially in contact with the ground. As illustrated, the base portion 110 has a generally conical or pointed shape, which can allow for precise placement of the base 110 at a desired point on the ground and which can prevent the base portion 110 from sliding on the ground, although this is not required. The rod 105 may be constructed of any suitable material, including without limitation a variety of woods, metals, plastics, and/or any suitable combination thereof. The rod 105 can be monolithic, and/or might comprise two or more separate components, which may be fixed and/or coupled together during manufacture and/or in operation. Merely by way of example, the base portion 110 of the rod 105 may be constructed of a metal, such as steel and/or an alloy, while the remainder of the rod 105 may be constructed of a different material, such as a composite.

Figure 1B:
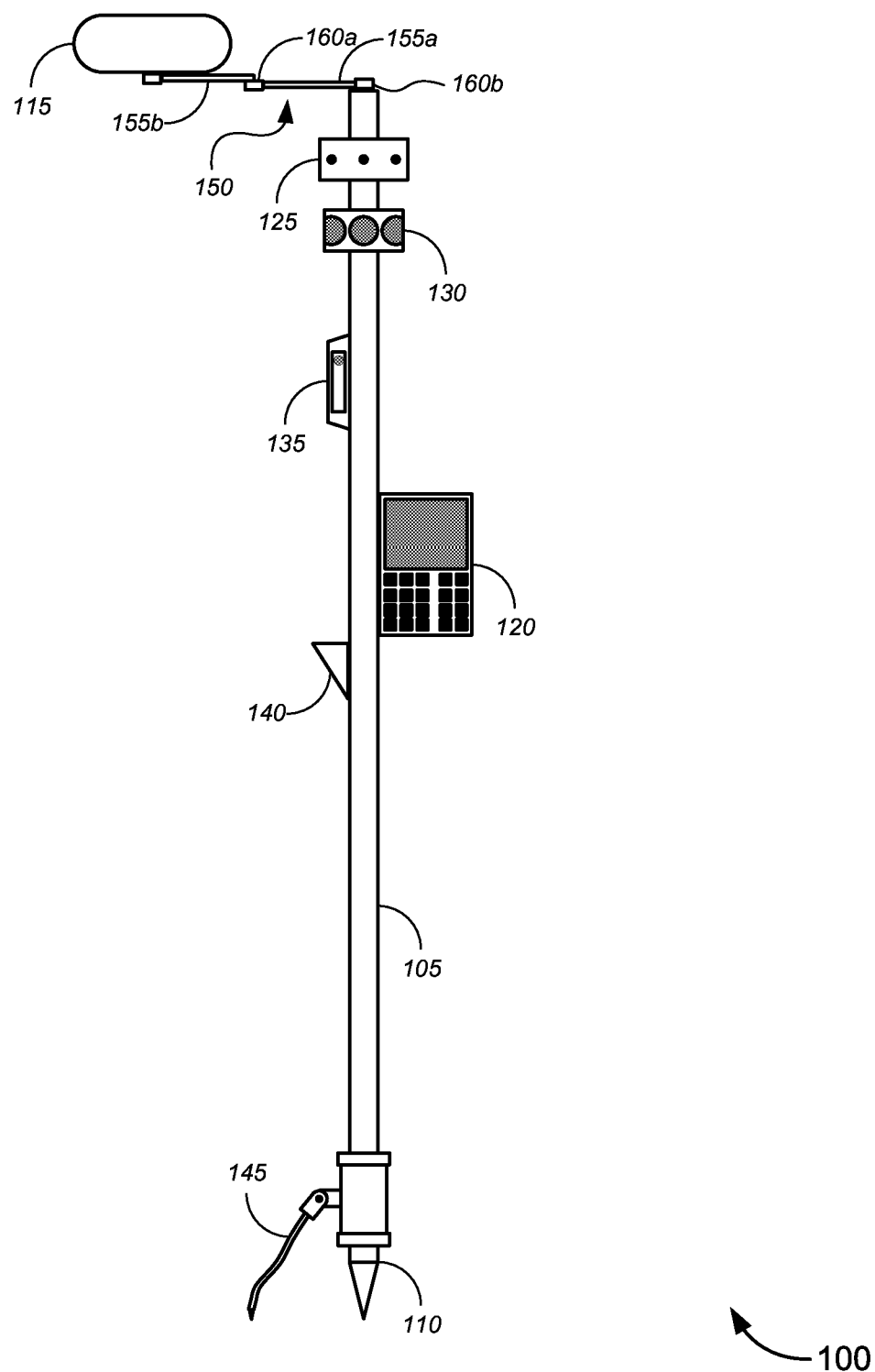

The rover 100 further comprises several subsystems, which are illustrated functionally on FIGS. 1A and 1B.

These functions of these subsystems may be separated or combined in any suitable fashion, and various embodiments are not limited to the architecture described herein, which should be considered only exemplary in nature. Merely by way of example, the functionality of the rover 100, in some embodiments, might be incorporated in to a single monolithic device. For ease of description, however, the exemplary embodiments discussed herein, group the functionality of the rover 100 into functional subsystems.

For example, a sensing subsystem 115, which may be permanently and/or removably coupled with (or otherwise affixed to) the rod 105. In certain embodiments, as shown, the sensing subsystem 115 sits atop the rod or is otherwise disposed on or near an end portion of the rod distal from the base portion 110. In some embodiments, as illustrated by FIG. 1B, the sensing subsystem 115 (and/or one or more components thereof) may be disposed on an arm 150 or other structure that is extendable (or permanently extended) laterally from the rod 105 (e.g. substantially perpendicular to the longitudinal axis of the rod 105), which can allow for a greater diversity of measurements to be performed using the rover 100, as described in further detail below. The rod 105 might include a battery compartment in the base portion 110, which can improve the balance of the rover 100.

In the embodiment illustrated by FIG. 1B, the arm 150 comprises two members 155 coupled by a pivot assembly 160a. One of the members 155a is coupled with the rod 105 by a second pivot assembly 160b, while the second member 155b is coupled with the sensing subsystem 115. This arrangement allows the sensing subsystem 115 to be stored atop the rod 105 (and/or perhaps locked into place in that position, using any of a variety of locking devices) or to be extended laterally away from the rod 105 (and/or perhaps locked into place in that position). It should be appreciated, based on the disclosure herein, that a variety of different mechanisms can be used to situate the sensing subsystem 115 (and/or portions thereof) laterally away from the rod 105, and the configuration illustrated by FIG. 1B is provided for exemplary purposes only.

Figure 2:
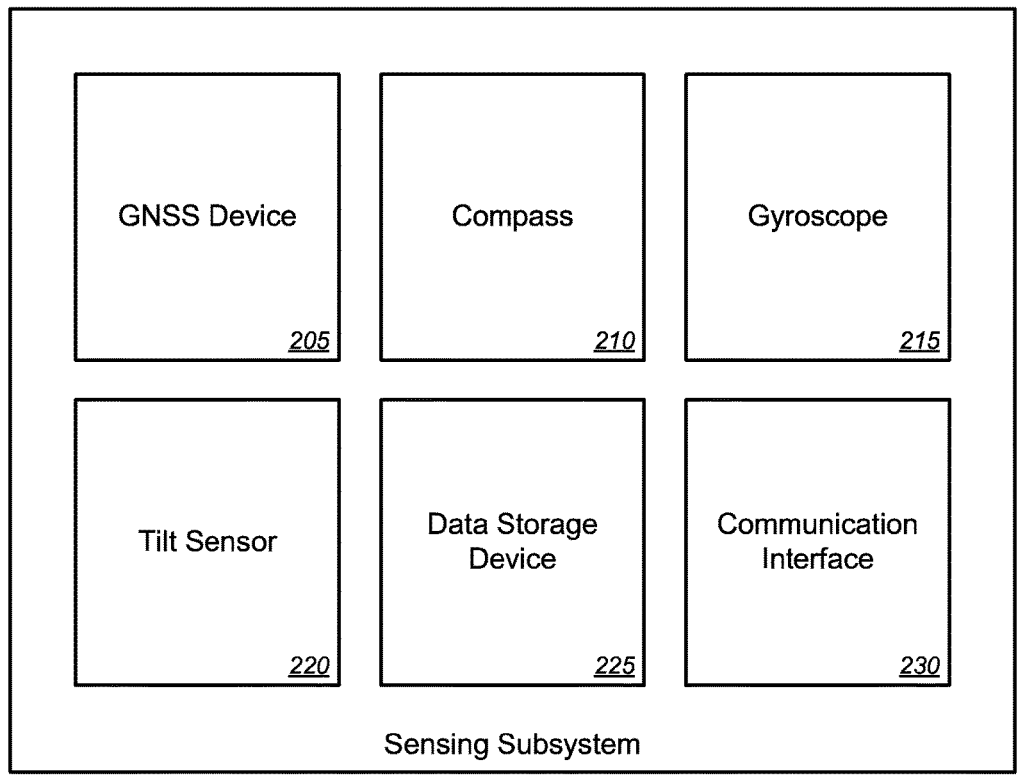
FIG. 2 is a generalized block diagram illustrating a sensor subsystem for a position measurement system, in accordance with various embodiments.

In certain aspects, the sensing subsystem 115 comprises one or more of a variety of different types of sensors, which can be used to gather data (e.g., for position measurement purposes). Merely by way of example, FIG. 2 is a functional block diagram illustrating the sensing subsystem 115 of FIG. 1 in further detail, in accordance with to certain embodiments. The various components of the sensing subsystem 115 may be incorporated within a single housing that encloses the entirety of the sensing subsystem 115; alternatively, the sensing subsystem 115 might comprise a plurality of components divided between two or more discrete housings. Similarly, certain structural components of the sensing subsystem 115 may be relatively more integrated and/or separated. Thus, the sensing subsystem 115 depicted by FIG. 2 should be considered a set of functional components, which may or may not correspond to individual structures.

As illustrated in FIG. 2, the sensing subsystem 115 comprises a GNSS device 205, which can be used to obtain a set of GNSS data, such as data identifying a position of the GNSS device 205 (and/or, more generally, the sensing subsystem 115 and/or the rover 100). In one aspect, the GNSS device 205 might comprise a GNSS receiver, an antenna, and/or any other necessary equipment, which may (but need not necessarily) operate in a conventional manner to receive and process signals from a navigation satellite constellation to determine the current position of the GNSS device 205. Additionally and/or alternatively, the GNSS device 205 might employ any of a variety of advanced satellite navigation techniques. Merely by way of example, in some cases the GNSS device 205 may be configured to employ real-time kinematics ("RTK") techniques, perhaps in conjunction with a base station that broadcasts a GNSS correction signal for reception by one or more rovers (and/or other GNSS devices), as is known in the art.

In one aspect, the GNSS device 205 can be used to determine an orientation (e.g. relative to a standard compass coordinate system of North, South, East, and West) of the rover 100. As used herein, the term "orientation" means any disposition of the rover that can be determined (in one, two, or three dimensions) as an angle from a reference point (or reference direction, such as magnetic North, true North, etc.). Merely by way of example, if the GNSS device 205 (and/or a receiver and/or antenna thereof) is extended away from the longitudinal axis of the rod 105, as illustrated by FIG. 1B, the rover 100 can be rotated about its longitudinal axis, which effectively rotates the GNSS device 205 (and/or the receiver/antenna) in an arc. Multiple sets of GNSS data can be obtained throughout the duration of this rotation, and from these multiple GNSS fixes the orientation of the rover 100 can be determined.

In some embodiments, the sensing subsystem 115 further includes a compass 210, which can be used to obtain compass orientation data, e.g., based on measurement of the Earth's magnetic field in the conventional manner. As described in further detail below, this compass orientation data can be used to calculate an azimuth to a target point. In some embodiments, a compass might not be accurate enough to be used for determining the azimuth to a target point. In such cases, the compass can be used to calculate the azimuth of the tilt direction of a tilted rod and/or to give a coarse orientation of the images with respect to North.

In other embodiments, the sensing subsystem 115 might comprise a gyroscope 215. Any of a variety of different types of gyroscopes may be used in accordance with different embodiments. Merely by way of example, in some cases the sensing subsystem 115 may comprise a mechanical gyroscope, while in other cases and electronic and/or MEMS-based microscope may be employed instead. Those skilled in the art will appreciate, based on the disclosure herein, that any of a variety of different types of known gyroscopes may be used in accordance with different embodiments. The gyroscope 215 can be used to obtain gyroscopic data about a relative orientation of the position measurement system, which, in turn, can be used inter alia to correct azimuths derived from other data (for example, an error in a compass azimuth caused by magnetic interference, etc.) As described in further detail below, backsighting to known points (using imagery, a coarse sighting telescope, etc.) can be used to obtain precise azimuth data on the orientation of the rover 100.

In some cases, the sensing subsystem 115 may include one or more tilt sensors 220, which generally can be used to determine the angle (e.g. in two dimensions from vertical) of the rod 105. A variety of different types of tilt sensors, including without limitation accelerometers, may be included in accordance with different embodiments. In some cases, the tilt sensor will be accurate to within at least 1°, while in other cases the tilt sensor may be accurate to within at least 0.1°. Merely by way of example, a set of embodiments may use one or more of the following tilt sensors: the SCA103T differential inclinometer, available from VTI Technologies Oy; the ADXL16209 dual-axis accelerometer, available from Analog Devices, Inc.; and the ADIS16209 dual-axis digital inclinometer and accelerometer, also available from Analog Devices, Inc. Other variations are possible.

Those skilled in the art of surveying will appreciate that a measurement tool should be substantially vertical when measuring position data and/or when calculating azimuths. Conventionally, a two-dimensional level bubble has been used to perform this function. In accordance with certain embodiments, however, the tilt sensor 220 (and/or a compass or other azimuth determination device) can be used to determine (and/or, in some cases, correct for) situations in which the rover 100 is not in a substantially vertical position when measurements are to be performed. Merely by way of example, as described in further detail below, input from the tilt sensor 220 can be used to inform the display of an electronic "bubble" for an operator, and/or can be used to adjust calculated positions and/or azimuths (at least within certain tolerances).

In addition to the sensors, the sensing subsystem 115 might also include supporting electronics. Merely by way of example, in many cases the sensing subsystem 115 may include a power supply (e.g., a rechargeable battery, and input line from an external power source, and/or the like), which is not illustrated on FIG. 2. The sensing subsystem 115 might also comprise a data storage device 225, which can be any device capable of storing data, either relatively temporarily (such as dynamic RAM) and/or relatively permanently (such as any of the computer readable media described in further detail below). The data storage device 225 can be used, inter alia, to store data collected by any or all of the sensors within the sensing subsystem 115.

The sensing subsystem 115 may also include a communication interface 230, which may comprise any necessary hardware and/or software for communicating with other components of the rover 100 (and/or external devices, such as the RTK base station described above). Thus, for example, the communication interface 230 might include a UHF radio, cellular radio, and/or other relatively long-range communication facilities. Additionally and/or alternatively, the communication interference 230 might include relatively short-range medication facilities, such as a Bluetooth transceiver, a Wi-Fi transceiver, a wired communication interface (such as an Ethernet port, a USB interface, and/or the like), etc. Those skilled in the art will appreciate that a variety of different types of communication techniques can be used, depending on bandwidth requirements, range requirements, cost requirements, and so forth.

Figure 6:
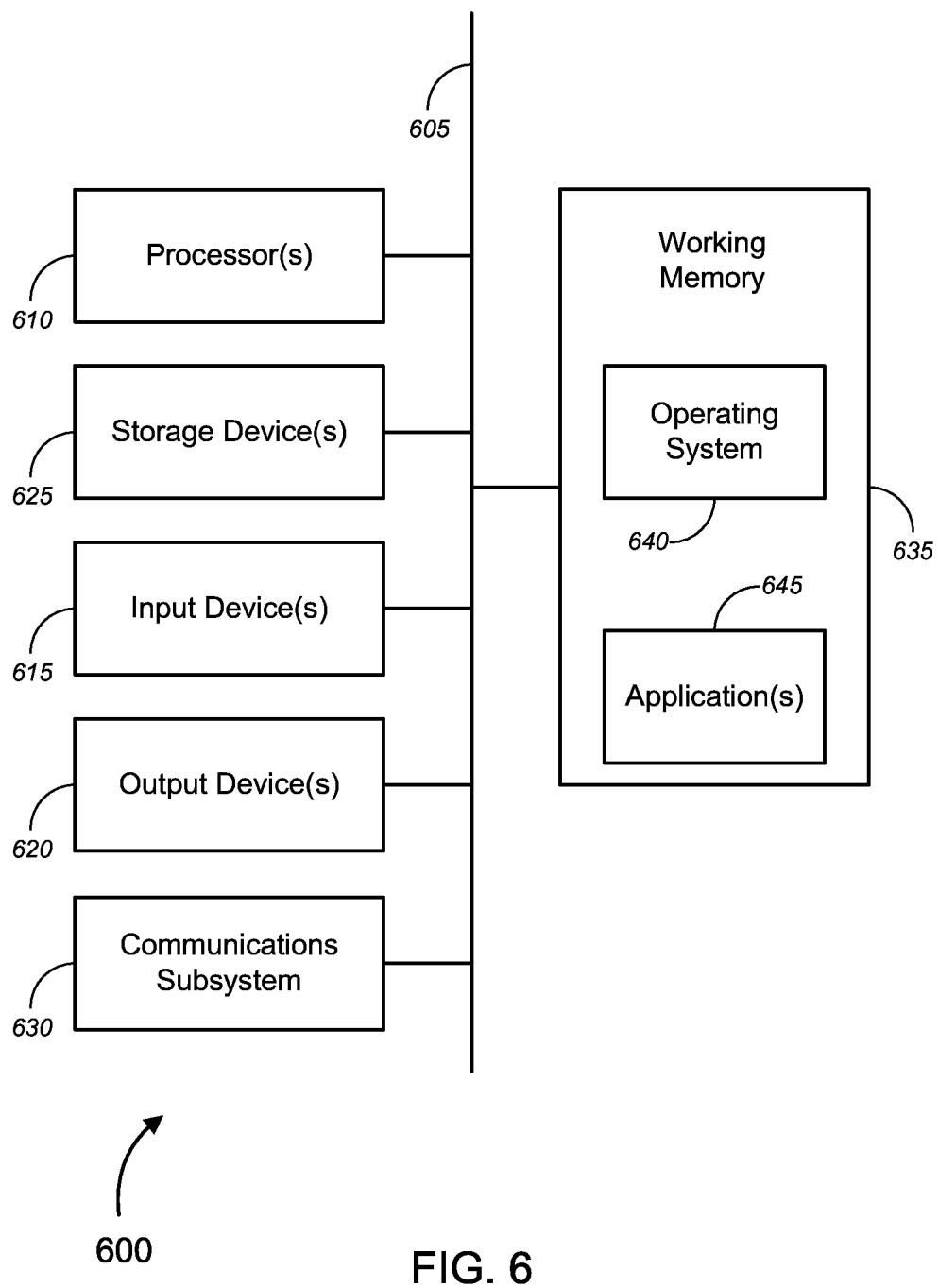
FIG. 6 is a generalized schematic diagram illustrating a computer system, in accordance with various embodiments.
Figure 7:
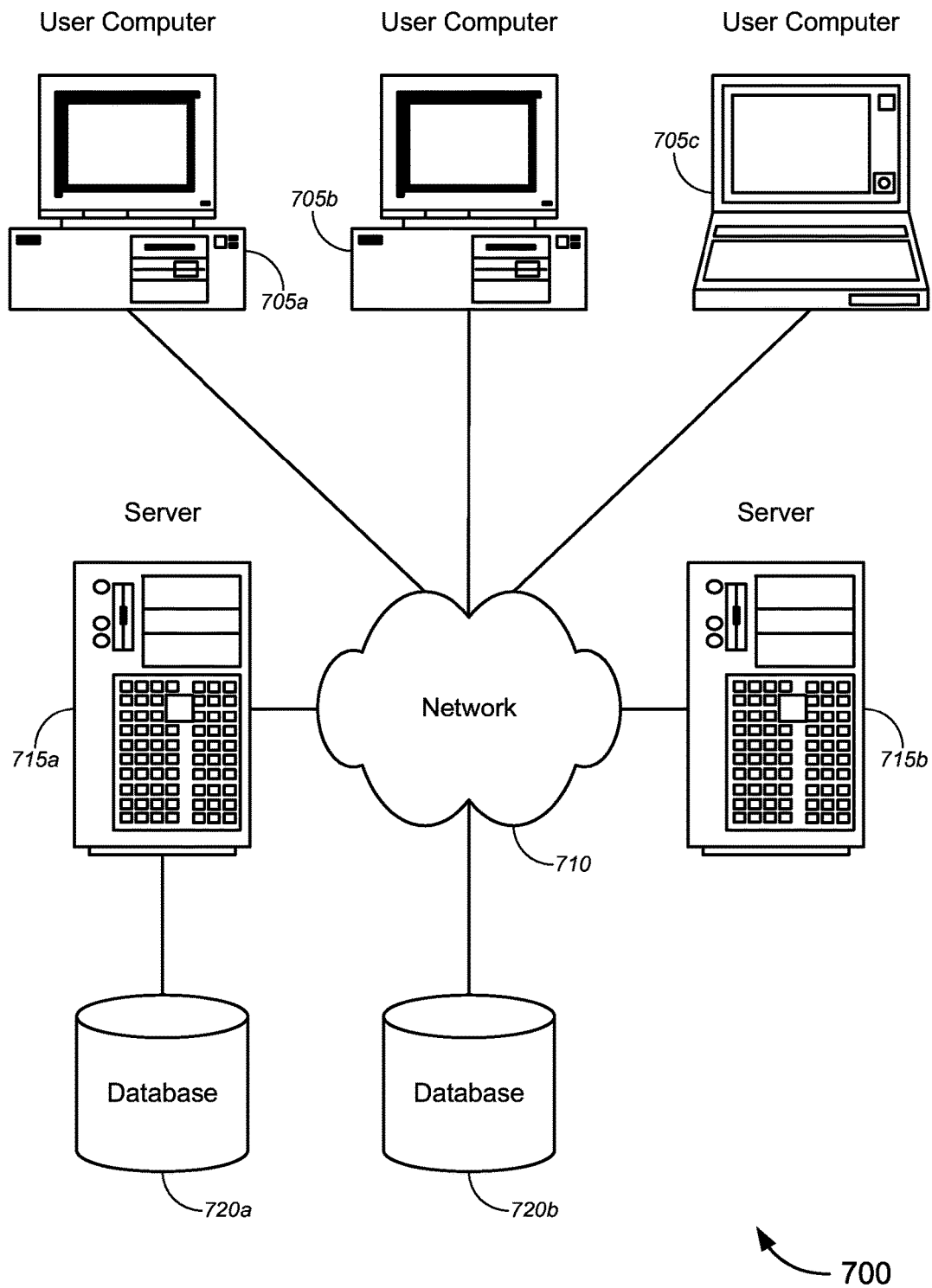
FIG. 7 is a block diagram illustrating a networked system of computers, which can be used in accordance with various embodiments.

Returning to FIGS. 1A and 1B, the rover 100 also comprises a control subsystem 120. The control subsystem 120 might comprise any device or combination of devices that can function to control and/or receive input from the other subsystems (e.g., the sensing subsystem 115, the image capture subsystem 130 described below, etc.). Thus, in one aspect, the control subsystem might comprise a special-purpose computing device, such as any of the field computers commercially available from Trimble Navigation Ltd., to name several examples. In another aspect, the control subsystem 120 might comprise a general purpose-computing system (e.g., a laptop computer, tablet computer, handheld computer or smartphone/PDA, etc.) programmed with software (e.g., a set of instructions) to perform methods for controlling the rover 100 (and/or its various subsystems) and/or for processing input received from the rover's subsystems. FIGS. 6 and 7, described in detail below, illustrate several exemplary computing systems, some of which could be used as a control subsystem 120 for the rover 100, in accordance with different embodiments.

Various embodiments of the control subsystem 120 might comprise different features and/or functionality Merely by way of example, in many cases, the control subsystem 120 will have a communication interface, which, like the communication interface of the sensing subsystem 115 described above, can feature any necessary hardware and/or software to support communication with the various subsystems and/or external devices. Such modes of communication may be short-range and/or long-range and may be wired, wireless, or both. In one aspect, the communication interface of the control subsystem 120 will comprise hardware and/or software that corresponds to the communication interface of the sensing subsystem 115 (and/or other subsystems), to allow for robust communication between the two subsystems. In another aspect, the control subsystem 120 might have a communication interface that supports longer-range communications (e.g., cellular or WWAN facilities), even if the other subsystems do not. The communication interface of the control subsystem 120 may be configured to allow communication with other special-purpose or general-purpose computers (both other control subsystems and other computers, such as an office computer) to allow information to be exchanged (e.g., uploaded, downloaded) between the control subsystem 120 and such other computers, for example, by local communications (e.g., Bluetooth, USB, etc.) and/or network communications (e.g., over the internet, a WWAN, a LAN, etc.).

In many embodiments, the control subsystem 120 will also include one or more input devices (e.g., one or more buttons, a keypad, keyboard, touchpad, mouse, etc.) and/or one or more output devices (e.g., display device, printer, etc.). In one aspect, a touchscreen might serve as both an input device and an output device for the control subsystem 120. The control subsystem 120 also will often include one or more processors and/or one or more computer readable storage media, each of which are described in detail below, for processing and storing, respectively, both software (e.g., executable instructions) and data (e.g., data received from the subsystems, data inferred or derived from subsystem input, etc.).

In an aspect, the control subsystem 120 comprises and/or provides a user interface (e.g., via the input and/or output devices). The user interface allows users to interact with the control subsystem 120 to control the operation of the subsystem 120 and/or of the rover 100 more generally. A variety of user interfaces may be provided in accordance with various embodiments, including without limitation graphical user interfaces that display, for a user, display screens for providing information to the user and/or receiving user input from a user.

In some cases, the user interface (and/or other functionality) of the control subsystem 120 might be provided (at least in part) remotely. Merely by way of example, in some embodiments, the control subsystem 120 may be configured to communicate (either relatively continuously or relatively sporadically) with a separate computer (described herein as an "office computer") e.g., via a dedicated application running on the office computer; in this situation, at least a portion of the user interface might be provided by the office computer, which could serve to communicate instructions to the control subsystem 120 and/or to receive data therefore. In this situation, providing the user interface might comprise providing instructions and/or data to cause or allow the office computer to display the user interface. Thus, when this document describes the functionality of the control subsystem 120, it should be understood that such operations could be performed locally (e.g., in the field) by the control subsystem 120, remotely (e.g., in an office) by the office computer, or in combined fashion (where each system provides some of the described functionality). In other embodiments, the user interface may be provided from a web site, e.g., by providing a set of one or more web pages, which might be displayed in a web browser running on the office computer and/or might be served by a web server.

A number of different physical configurations of the control subsystem 120 are possible. In one embodiment, for example, the control subsystem 120 might be permanent (or relatively) permanently mounted on the rod 105, e.g., using any of a number of available adhesive substances and/or mounting hardware. In another embodiment, the control subsystem (and/or a housing thereof), might be formed integrally with the body of the rod 105. In other embodiments, however, the control subsystem 120 might be only removably mounted on the rod 105 (e.g., using hook-and-loop fasteners, removable brackets, etc.) and/or might be physically separate from (and/or optionally tethered to) the rod 105.

In other embodiments, the rover 100 includes an image capture subsystem 125. In general the image capture subsystem 125 comprises any device, or set of devices, that is capable of capturing (still or moving) optical images. In some cases, the image capture subsystem 125 (and/or any individual image capture devices therein) will include any necessary hardware and/or software to store (at least temporarily) captured images, process captured images, and/or transmit captured images, either pre- or post-processing, to another device (such as a control subsystem 120) for storage, display, processing, etc. The image capture subsystem 125 may or may not have a display device for displaying captured images. Fundamentally, however, the image capture subsystem 125 need only have the necessary facilities for capturing optical images.

More specifically, the image capture subsystem 125 often comprises one or more image capture devices (e.g., digital cameras) that collectively capture a panoramic image of the leased a portion of the landscape surrounding the rover 100. A particular embodiment, for example, includes a plurality of cameras that collectively capture a larger radial field of view than a single, standard camera can accommodate.

To illustrate, FIG. 3A shows a plan view of an image capture subsystem (or "imaging subsystem") 125, which may be incorporated in a rover such as the rover 100 of FIGS. 1A and 1B. The image capture subsystem 125 of FIG. 3A includes eight image capture devices 305 each of which has a field of view 310, although different embodiments may use more or fewer image capture devices 305 (for example, one set of embodiments might comprise seven image capture devices). In some cases, the image capture subsystem 125 might include a flash device (such as an LED flash) for each image capture device 305; the flash might have the same field of view as the corresponding image capture device 305.

As can be seen from FIG. 3A, each image capture device 305 has a field of view 310 that overlaps with the fields of view 310 of the adjoining image capture devices 305. Collectively, image capture devices cover a panoramic (radial) field of view defined by the angle α, which in the illustrated case, is 360°. Thus, in the illustrated embodiment, the image capture subsystem 125 can capture a panoramic image that includes the entire visible landscape (at least outside of a minimum radius). One skilled in the art will appreciate that known techniques exist to generate a composite image from each of the individual images captured by each image capture device, thus providing a single image comprising the collective field of view of the entire set of image capture devices 305.

As can be seen from FIG. 3A, however, inside a certain radius, the fields of view of the image capture devices 305 do not overlap, resulting in a gap in the coverage provided by image capture devices 305. Accordingly, in some embodiments, the image capture subsystem 125 may include two sets of cameras, e.g., one set disposed with a field of view that extends generally laterally from image capture device 125, and another set (which may be disposed with a field of view below the horizontal) configured to obtain images within that minimum radius, inside of which the fields of view of the first set of image capture devices do not overlap. Moreover, the second set of image capture devices can capture points of interest and/or tiepoints that are sufficiently close to the rover that they fall outside the field of view of the first set of image capture devices; similarly, the second set of image capture devices can document the area in the immediate vicinity of the rover.

To illustrate, FIG. 3B illustrates an elevation view of the rover, including the rod 105 in the image capture subsystem 125. In the illustrated embodiment, the image capture subsystem includes a first image capture device 305, with a generally horizontal field of view 310a, and a second image capture device 315 that has a field of view 310b. Extending horizontally from the base of the rod 105, the field of view 310b of the second image capture device 315 has a minimum distance x and a maximum distance y at which an image of the ground can be captured, while the field of view 310a of the first image capture device 305 has a minimum distance z at which the field of view meets the ground. The two image capture devices 305, 315 are configured so that the fields of you overlap (i.e., the distance z is less than the distance y), which allows a composite field of view from minimum distance x to the maximum focal range of the first image capture device 305, which generally is limited only by the resolution of that device. As can be seen from FIG. 3C, which is a plan view of FIG. 3B, the field of view 310b may also have a greater radial field of view (at a given radius from the device) than the corresponding field of view 310a of the first image capture device.

It should be realized, of course, that for ease of illustration, FIGS. 3B and 3C depict two sets of image capture devices comprising only one image capture device each, denoted 305, 315, respectively, this principle can be applied to the embodiment depicted in FIG. 3A, resulting in two sets of image capture devices, each having a plurality of cameras. Merely by way of example, in one embodiment, the first set of cameras might comprise seven cameras 305 having a collective panoramic field of view a of approximately (or precisely) 360° and field of view of the ground that extends from a minimum radius (z) of approximately 5 meters, while the second set of cameras might comprise five cameras 315 having a collective panoramic field of view a of approximately 180° (or, in some cases, more than 180°, such as approximately 200°), a field of view of the ground that extends from a minimum radius (x) of approximately 0.6 meters to a maximum radius (y) of approximately 6 meters.

Other configurations are possible as well. Merely by way of example, in some cases, an image capture subsystem 125 might comprise one or more cameras (or other image capture devices) having a collective panoramic field of view of at least about 50°, of at least about 170°, and/or of at least about 350°. There might be one set of cameras, two sets of cameras, or more. In an exemplary configuration, a first set of image capture devices might be equally spaced in radial fashion around the circumference of the rod, and a second set of cameras might be equally spaced in radial fashion around half of the circumference (or the entire circumference) of the rod.

Many different types of image capture devices may be employed by the image capture subsystem 125. Those skilled in the art will appreciate that the characteristics of a selected image capture device often will affect the qualities of captured images, and image capture devices therefore may be chosen in accordance with the needs of particular implementations. As described in further detail below, the image capture subsystem 125 may be used for a variety of purposes, including without limitation, target point selection, photogrammetric analysis, and others. Accordingly, the type and nature of the image capture device(s) may vary by implementation.

In one embodiment, for example, the OV5462 5 megapixel CMOS image sensor, commercially available from OmniVision Technologies, may be used as an image capture device. This may be coupled with optics, such as an f=3.5 mm lens. In other cases, one or more commercially available digital cameras (e.g., consumer, "prosumer" or professional-grade cameras) may be employed as image capture devices.

Returning again to FIGS. 1A and 1B, the rover 100 might also include an optical target such as a prism 130. The prism 130 can allow the rover 100 to function, inter alia, as an optical target for another rover, total station, etc. In one aspect, the prism 130 can comprise any device, or plurality of devices, that can have properties (e.g., reflectivity) that facilitate the (e.g., electronic and/or optical) acquisition of the prism 130 by another position measurement device.

The rover 100 might also include a distance measurement subsystem 135. The distance measurement subsystem 135 can comprise any device(s) that is/are capable of measuring, inferring, or otherwise determining a distance from the rover 100 to a target point, and/or a distance between two target points. Merely by way of example, in one embodiment, the distance measurement subsystem might be an electronic distance measurement ("EDM") subsystem comprising an EDM device, which might be, for example, a laser emitter/receiver combination that is configured to emit laser light and received light reflected from an optical target at the target point.

In a novel aspect of some embodiments, the distance measurement subsystem 135 is configured to have the ability to perform distance measurements not only in a horizontal (or roughly horizontal) plane, but also at relatively extreme angles from the horizontal. This can enable the rover 100, for example, to measure distances above the rover 100 (e.g., to a ceiling, top of a building, etc.) and/or measure distances below the rover 100 (e.g., down a manhole, etc.) while still maintaining the rover 100 with the longitudinal axis perpendicular (or generally perpendicular) to the ground surface. One technique employed by certain embodiments for accomplishing this functionality is to provide a mechanism by which the distance measurement subsystem 135 can be rotated in a vertical plane (e.g., along an axis perpendicular to the longitudinal axis of the rover 100). In another aspect, the distance measurement subsystem 135 might be disposed with an aperture eccentric to longitudinal axis of the rod 105. As such, the distance measurement subsystem 135 can be rotated to aim upward or downward (as far as vertical, in some cases), while the longitudinal axis of the rod 105 is maintained in a substantially vertical position. (Of course, in other embodiments, the aperture of the distance measurement subsystem 135 might be aligned with the axis of the rod 105.)

To illustrate, FIGS. 4A-4D depict a distance measurement subsystem 135. FIG. 4A illustrates a front elevation view of the distance measurement subsystem 135, while FIGS. 4B-4D illustrate a side elevation view of the distance measurement subsystem 135, in different configurations. In the illustrated embodiment, the distance measurement subsystem 135 is shown as comprising an outer housing portion 405 and an inner body 410 that rotates around an axis that is implemented as an axle 415 through both the outer housing portion 405 and the inner body 410. In the illustrated embodiment, the inner body 410 houses the necessary electronics to implement distance measurement functionality, although this is not required; in other embodiments, some or all of the electronics might be disposed in the outer housing 405 or elsewhere. As illustrated, the distance measurement subsystem 135 is an EDM subsystem comprising consolidated laser emitter/receiver 420, although other embodiments may feature different capabilities and/or structures.

In certain embodiments, the distance measurement subsystem 135 further includes any necessary electronics (not shown, but known in the art) for processing data obtained by the laser emitter/receiver 420 and/or any necessary communication interface(s) for communicating with other subsystems, including in particular a control subsystem, which may be configured to receive and/or process raw data obtained by the laser emitter/receiver 420, which can minimize the amount of processing required by the distance measurement subsystem 135 itself. In other embodiments, the distance measurement subsystem 135 may be configured to perform such processing itself, and/or may be configured to provide processed data, such as a distance measurement, to the control subsystem. In yet other embodiments, the distance measurement subsystem 135 may be integrated with one or more other subsystems (e.g., a sensing subsystem, a control subsystem, an image capture subsystem, etc.) and/or might include an integrated camera (which might display output on a dedicated display screen or on the rover's display screen), which can allow the operator to ensure that the emitter is focused on the appropriate object point.

Any suitable mechanism can be used to mount and/or secure the distance measurement subsystem 135 to the rod 105 (either permanently and/or removably). Merely by way of example, as illustrated, the outer housing 405 comprises (and/or has affixed thereto) two mounting tabs 425, which can be inserted into corresponding mounting slots on a rod 105 and locked into place in conventional fashion, allowing the distance measurement subsystem 135 to be removably secured to an outer surface of the rod 105, as shown in FIGS. 1A and 1B. It should be appreciated, of course, that other attachment mechanisms, such as screws/bolts, hook-and-loop fasteners, compressive bands, and/or the like could be used in other embodiments. In some cases, the distance measurement subsystem 135 (and/or a portion thereof, such as the outer housing 405 might be bonded to, and/or integrally formed with, the rod 105 itself.

As illustrated, the axle 415 allows the inner body 410 to be rotated in a vertical plane relative to the outer housing 405 (which, as noted above, may be secured generally coplanar to the rod 105 of the rover). When the inner body is rotated, the laser emitter/receiver can be aimed either generally upward, as shown in FIG. 4C, generally downward, as shown in FIG. 4D, or at any desired angle to the horizontal. In some cases, the distance measurement system might be configured with detents at desired rotational positions (such as when the inner body 410 is parallel to the outer housing 405 as shown in FIG. 4B, when the inner body 410 is perpendicular to the outer housing 405, as shown in FIGS. 4C and 4D, etc.) and/or might otherwise provide feedback and/or resistance to movement of the inner body 410 relative to the outer housing 405. In other embodiments, the distance measurement subsystem 135 might not include a separate inner body 410 and outer housing 405 at all.

In an aspect of certain embodiments, the distance measurement subsystem 135 can include a vertical angle sensor, which can be used to measure a vertical angle of the laser emitter/receiver 420. In some cases, this measured angle might be relative to the longitudinal axis of the rod 105; in other cases, this measured angle might be relative to the horizontal (i.e., normal to the gravity vector at the location of the rover) or vertical (i.e., parallel to the gravity vector at the location of the rover). In the former case, the vertical angle between the emitter and the horizontal or vertical can be derived from a measurement taken by a tilt sensor that measures the tilt of the rod 105 itself. The vertical angle sensor can be electronic (e.g., a sensor that measures deflection of the emitter/receiver's 420 vertical from the gravity vector) or mechanical (e.g., a system of stops or detents that limit vertical rotation of the inner body 410 around the axle 415 at predetermined intervals). In some cases, the vertical angle sensor can be an electro-mechanical step encoder (e.g., a system of stops or detents, as described above, with a sensor that measures, and provides input to the control system regarding, the position of the inner body 410 relative to the outer housing 405, and by extension, the rod 105).

Using the vertical angle sensor, the rover can measure not only the horizontal distance from the rover to an object point (i.e., the horizontal component of the measured distance which can be calculated trigonometrically from the measured and/or calculated vertical angle of the emitter/receiver 420), but also a height of the object point relative to the rover (i.e., the vertical component of the measured distance, which can also be calculated trigonometrically). As described in further detail below, this data can be used, inter alia, to develop position solutions for object points.

Returning to FIGS. 1A and 1B, the rover 100 might also include a bubble level 140, which can be integrally formed with the rod 105 and/or affixed thereto using any suitable mechanism. As is known in the art, a bubble level can assist the operator in assuring that the rod 105 is in a substantially vertical position when performing measurements. In some embodiments, the level 140 is a conventional bubble level that can indicate horizontal alignment in two dimensions, such as a bullseye-type spirit bubble level, or a pair of tubular spirit bubble levels positioned orthogonally.

In other embodiments, however, the level bubble may be a simulated bubble (referred to herein as an "electronic bubble") comprising an electronic display simulating a conventional spirit bubble. In one set of embodiments, for example, depicted by FIGS. 10A-10D and described in further detail below, an electronic display might simulate a bullseye-type spirit bubble level. In accordance with such embodiments, the level bubble 140 comprises electronics that receive inputs from inclinometers (which might include one or more tilt sensors within a sensing subsystem, as described above) and drive a display to simulate the behavior of a conventional level bubble. Thus, in one aspect, the electronic level bubble of certain embodiments is as simple for an operator to use and understand as a conventional bubble level. In other aspects, however, embodiments that employ an electronic bubble level can provide advanced functionality discussed in further detail below. Merely by way of example, in some cases, the size of the bubble and/or the bullseye can be adjusted to reflect the degree of sensitivity to tilt of other measurements (based, for example, on the quality of available azimuth data). As another example, the sensitivity of the bubble itself can be adjusted by the operator in some cases; for example, those skilled in the art will appreciate that a typical spirit bubble will have, e.g., a 40 minute sensitivity, while an operator performing high-precision work might instead use a spirit bubble with a 10 minute sensitivity. Using an electronic bubble in accordance with certain embodiments, the operator can select a desired precision (e.g., within a continuum of precision levels, from among a set of pre-defined precision levels, etc.).

The bubble display might comprise, for example, a LCD matrix and/or an LED display with dimensions similar to those of a conventional level bubble apparatus. In some cases (as illustrated on FIGS. 1A and 1B), the electronic bubble may be displayed on a device separate from the control subsystem 120. In another embodiment, the electronic bubble may be displayed (e.g., in a dedicated area) by the display device of the control subsystem 120.

Figure 5A:
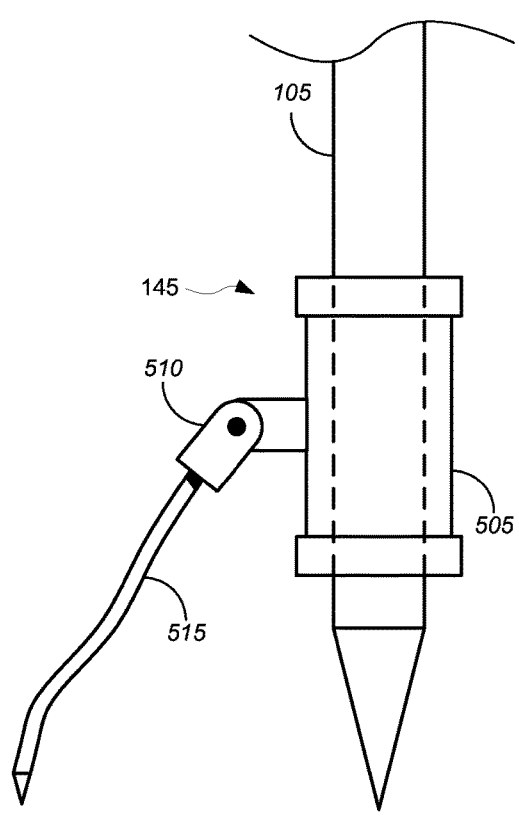
FIGS. 5A and 5B illustrate a support device for a position measurement system, in accordance with various embodiments.
Figure 5B:
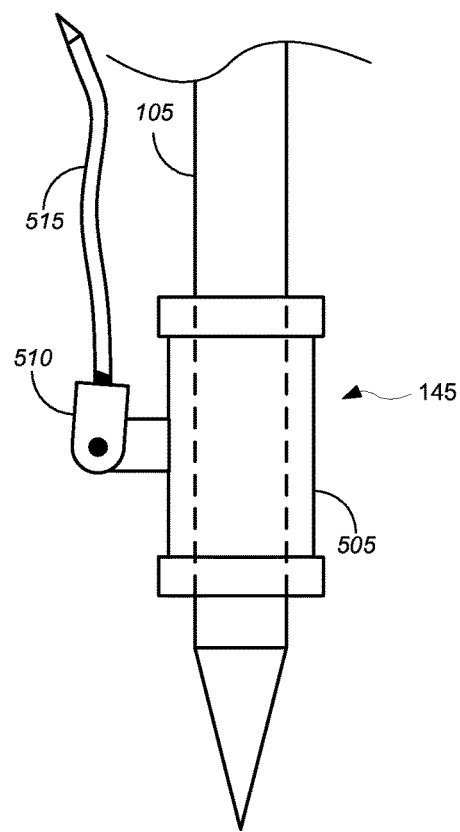

One problem with many position measurement systems is that the rotational vibration around the longitudinal axis of the rod is high due to the low rotational inertia compared to the inertia of the rod in the other 2 rotation- (tilt-) axis. Thus, in certain implementations, the rover 100 further comprises a support device 145. In some aspects, a support device can reduce the rotational noise when pointing to a target by up to a factor of five, allowing for much more precision when aiming the rover (e.g., for EDM measurements, image capture, etc.). In accordance with various embodiments, any of a variety of different types of support devices may be employed. FIGS. 5A and 5B illustrates but one example of such a support device 145. The exemplary support device 145 comprises a sleeve 505, which is designed to enclose a circumference (or perimeter) of the rod 105. In certain aspects, the sheath 505 is size to provide a friction fit with the rod 105. In some embodiments, the sleeve 505 and/or the rod 105 may be designed (e.g., with ridges and/or detents) to prevent the sleeve 505 from sliding with respect to the rod 105. In other embodiments, the sleeve 505 may be designed to slide along a portion of the rod 105.

The sleeve 505 may be constructed from any of a variety of materials, including without limitation, metals, alloys, plastics, and/or the like. In an aspect, the sleeve 505 is constructed from a material of sufficient strength and/or thickness to resist deformation and/or breakage when subjected to normal operating loads. Alternatively and/or additionally, the sleeve 505 may be integrally formed with and/or bonded to the rod 105, and/or may be omitted entirely.

The support device 145 further comprises a coupling mechanism 510, which may comprise, for example, a pivot device, in which couples the sleeve 505 (and/or the rod 105 itself) with a support leg 515. In one aspect, the coupling mechanism 510 allows the support leg 515 to be extended (as illustrated in FIG. 5A) or retracted (as illustrated in FIG. 5B). Thus, in operation, the support leg 515 can be extended laterally from the base of the rod 105 to be in contact with the ground, providing an additional base of support for the rover 100, while the support leg 515 can be retracted to allow for easier transportability or in situations in which additional support is not required.

In a particular embodiment, the sleeve 505 is placed in mechanical communication with the rod 105 through the use of a high viscosity material, such as a suitable grease, to enable the sleeve 505 to rotate slowly about the rod 105 but to dampen or impede vibration and other high-speed movement of the sleeve 505 relative to the rod 105. In such embodiments, the rod 105 can be rotated, to allow for desired alignment for position measurement tasks, while the support leg 515 remains extended to provide enhanced stability. Further, the frictional fit and/or the high-viscosity material between the sleeve 505 and the rod 105 allows for relatively precise rotation of the rod 105 within the sleeve 505 without introducing undue instability when measurements are performed.

FIG. 6 provides a schematic illustration of one embodiment of a computer system 600 that can perform the methods provided by various other embodiments, as described herein, and/or can function as control subsystem, office computer, and/or the like. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

FIG. 7 illustrates a schematic diagram of a networked system 700 that can be used in accordance with one set of embodiments. The system 700 can include one or more user computers 705. In one aspect, a control subsystem of a position measurement device can be considered a user computer 705. In another aspect, a user computer 705 might serve as an office computer, as described herein. Thus, a user computer 705 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 705 can also have any of a variety of applications, including one or more applications configured to perform methods provided by various embodiments (as described above, for example), as well as one or more office applications, database client and/or server applications, and/or web browser applications. Alternatively, a user computer 705 can be any other electronic device, such as a thin-client computer, Internet-enabled mobile telephone, and/or personal digital assistant, capable of communicating via a network (e.g., the network 710 described below) and/or of displaying and navigating web pages or other types of electronic documents. Although the exemplary system 700 is shown with three user computers 705, any number of user computers can be supported.

Certain embodiments operate in a networked environment, which can include a network 710. The network 710 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 710 can include a local area network ("LAN"), including without limitation a fiber network, a USB connection, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715. In some cases, one or more servers 715 might be part of a cloud computing environment familiar to those skilled in the art. In a set of embodiments, one or more servers 715 (whether part of a computing cloud or standalone, dedicated servers) might be configured serve as remote data storage and/or processing facilities for a rover or other system devices. For example, as described herein, a rover collects and processes large amounts of data in performing certain activities (such as image processing, site orientation, and/or photogrammetry, to name a few examples). In some cases, it might be more efficient for a server 715 to store and/or process that data. Thus, for example, a rover might capture data using its imaging subsystem, sensing subsystem, etc., and transmit that data to a server (and/or cloud computing environment), which could store the captured data, process the captured data (e.g., using the methods described herein), store the processed data (and/or the output of the processing operations, such as locations of tie points, object points, etc.), and/or transmit the processed data (and/or the output of the processing operations) to one or more rovers (including, but not limited to the rover that captured the original data) to be used in further operations.

Thus, the system 700 might employ a variety of different types of servers 715. Merely by way of example, one of the servers 715 may be a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 705 and/or another server 715. In some embodiments, an application server can create web pages dynamically for displaying the information in accordance with various embodiments. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720*a* might reside on a storage medium local to (and/or resident in) a server 715*a* (and/or a user computer 705). Alternatively, a database 720*b* can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 735 can be a relational database, such as an Oracle database, that is adapted to store, update, and retrieve data in response to SQL-formatted commands. The database might be controlled and/or maintained by a database server, as described above, for example.

Exemplary Workflows

Another set of embodiments provides workflows and other methods that can be performed by, or with, a position measurement device, such as those described above. Merely by way of example, FIGS. 8-18 illustrate various methods and associated techniques that can be used to facilitate position measurement tasks. While the methods and techniques of FIGS. 8-18 are illustrated, for ease of description, as different methods, it should be appreciated that the various techniques and procedures of these methods can be combined in any suitable fashion, and that, in some embodiments, the methods and techniques depicted by FIGS. 8-18 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments.

Moreover, while various of the methods and techniques illustrated by FIGS. 8-18 can be implemented by (and, in some cases, are described below with respect to) the rover 100 of FIGS. 1A and 1B (or components thereof) and/or associated field computers and/or office computers, these methods may also be implemented using any suitable hardware implementation. For example, in some embodiments, various portions of a method or workflow may be performed by a rover 100 (and/or a control subsystem thereof), while other portions may be performed by an office computer or the like. The respective functionality of such devices can be arranged in any suitable fashion. Similarly, while the position measurement system 100 of FIGS. 1A and 1B, an office computer system, and/or components thereof, can operate according to the methods and techniques illustrated by FIGS. 8-17 (e.g., by executing instructions embodied on a computer readable medium), these devices can also operate according to other modes of operation and/or perform other suitable procedures.

Although FIGS. 8-18 do not specifically discuss calibration of the rover and other devices, it should be appreciated that, in many cases, proper calibration of the rover is assumed. Rover calibration can encompass many different procedures. Merely by way of example, in some cases, an imaging subsystem will be calibrated. Calibration of an imaging subsystem (or a component thereof, such as a camera) can include, without limitation, interior camera calibration, which can assign values to parameters for distortion, the principal distance and the principal point of each camera. Imaging subsystem calibration can also include exterior calibration of parameters such as the position of the projection center (entrance pupil of the lens of each camera) in the imaging subsystem coordinate frame and the orientation of each camera (in 3 angles) with respect to the imaging subsystem coordinate frame. Various sensors of the rover might also be calibrated. For example, sensor calibration can calibrate, translate, etc., the local coordinate systems of the sensors (e.g., position determination devices, tilt and vertical angle sensors, azimuth determination devices, gyroscopes, imaging subsystems, etc.) to the coordinate system of the general position measurement system, which describes the relation of the position measurement system to a global coordinate system or local coordinate system of the working site. Other calibration operations are possible as well.

Figure 8:
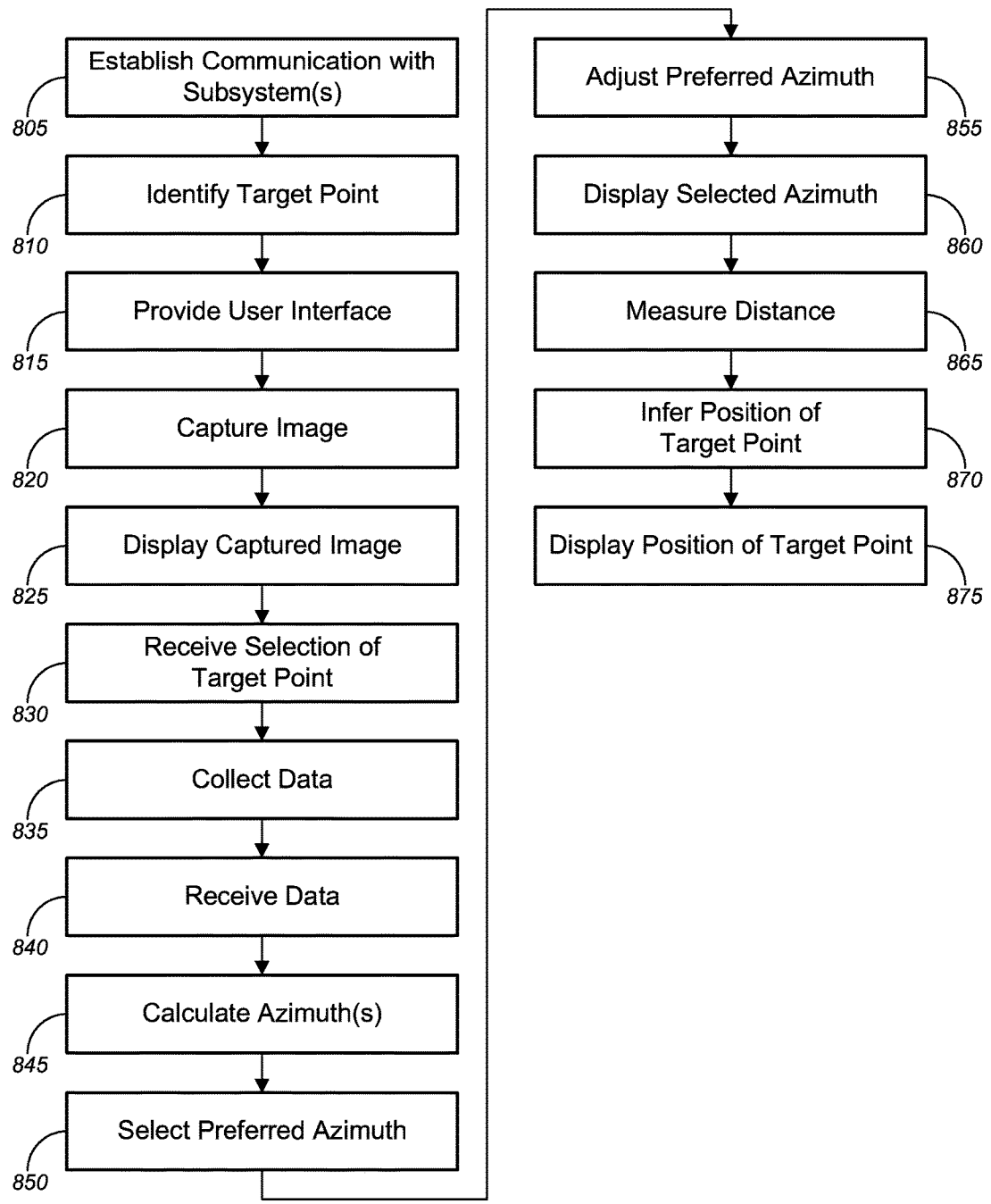
FIG. 8 is a process flow diagram illustrating a method of determining a position of a target point, in accordance with various embodiments.

FIG. 8 illustrates, in accordance with one set of embodiments, a method 800 of determining the position of a target point. In some cases, the method 800 can be performed with a rover like those described above. Alternatively and/or additionally, the method 800 might be performed or with another suitable position measurement system. In further embodiments, certain portions of the method 800 (e.g., data capture, etc.) might be performed with a rover (or other position measurement system), while other portions (e.g., processing, etc.) might be performed with an office computer.

At block 805, the method 800 comprises establishing communication between the control subsystem (or other computer system) and one or more other subsystems of the rover, such as an image capture subsystem, a sensing subsystem, a distance measurement subsystem, and/or the like. In an aspect, such communication is established using the respective communication interfaces of the control subsystem and other subsystems, and this communication path provides the control subsystem (or other computer system) to control operation of (or otherwise provide instructions to) the various subsystems and/or to receive data from those subsystems, as described in further detail below.

The method 800 further comprises identifying a target point (block 810). In some cases, identifying a target point may be a relatively simple procedure. Merely by way of example, a rover might have a spotting scope having a reticle, and identifying a target point might comprise aligning the rover so that the reticle of the spotting scope is centered on the target point (and/or an optical target stationed at the target point).

In other cases, the method 800 might employ enhanced procedures for identifying a target point, e.g., by taking advantage of certain advanced functionality of a rover. Merely by way of example, in some embodiments, the rover might be configured to receive radio frequency (or other) signals from a total station or other device located at a target point, and the identification of the target point might comprise receiving such signals and locating the target point based (at least in part) upon such signals. Alternatively and/or additionally, a laser receiver (such as and EDM) might be configured to receive light emitted from an emitter at a target point (and/or to receive light reflected from an optical target at a target point) in order to identify the target point.

In other embodiments, identification of a target point might comprise allowing a user to select the target point on a display. Such a point can include, for example, a target point in an image previously captured by the rover (or captured by another device and loaded into the control system of the rover), a target point on a map image loaded into the control system of the rover, etc. For example, the method 800 might comprise providing a user interface (block 815) to allow interaction between a user (e.g., an operator of a rover, an office computer, etc. etc.) and a control subsystem of the rover and/or another computer. Hence, when this document describes procedures for displaying (or otherwise providing) information to a user, or to receiving input from a user, the user interface may be the vehicle for the exchange of such input/output.

For example, the user interface can be used to output information (such as a captured image landscape surrounding the rover, from which one or more target points can be selected, position information, etc.) for a user, e.g., by displaying the information on a display device, printing information with a printer, playing audio through a speaker, etc.; the user interface can also function to receive input from a user (such as a selection of a target point), e.g., using standard input devices such as mice and other pointing devices, motion capture devices, touchpads and/or touch screens, keyboards (e.g., numeric and/or alphabetic), microphones, etc.

The procedures undertaken to provide a user interface, therefore, can vary depending on the nature of the implementation; in some cases, providing a user interface can comprise displaying the user interface on a display device; in other cases, however, in which the user interface is displayed on a device remote from the control subsystem (such as on an office computer, wireless device, etc.), providing the user interface might comprise formatting data for transmission to such a device and/or transmitting, receiving and/or interpreting data that is used to create the user interface on the remote device. Alternatively and/or additionally, the user interface on an office computer (or any other appropriate user device) might be a web interface, in which the user interface is provided through one or more web pages that are served from the control subsystem (and/or a web server in communication with the computer system), and are received and displayed by a web browser on the office computer (or other capable user device). The web pages can display output from the control subsystem and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (a few examples of which are provided below) each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. In some cases, an image (such as an imaged captured by an image capture subsystem and displayed on a display device) can serve as a user interface mechanism for receiving input, such as a selection of a target point by selecting a corresponding location in the image (e.g., by touching the desired location on an image displayed on a touch screen, selecting the desired location with a mouse, etc.)

While any illustrated exemplary display screens might employ specific user interface elements appropriate for the type of information to be conveyed/received by a rover's control subsystem (or other computer system) in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

At block 820, the method 800 might comprise capturing an image, e.g., with a rover's image capture subsystem. Merely by way of example, the control subsystem might send an instruction to the image capture subsystem to begin capturing an image of the surrounding landscape; this image may be static (i.e., a still image) and/or may be continuously updated—for example, the image capture subsystem may capture video of the surrounding landscape, which may be transmitted to the control subsystem (or the computer subsystem) on a continuous basis, perhaps until an instruction received from a user to freeze the image, at which point the selected frame becomes a still image. In any event, the captured image (and/or, more precisely, data representing the captured image) may be transmitted from image capture subsystem to the control subsystem (and/or another computer) for display and/or further processing.

The method 800 might further comprise displaying, with a user interface, the captured image for an operator (block 825). For example, in some cases, the control subsystem may display the image on a display device associated with the control subsystem. In other embodiments, an office computer might display the image on a monitor, etc. At block 830, then, the method 800 comprises receiving a selection of a target point from the user. In some cases, for example, if the control subsystem comprises a touch screen, receiving a selection of the target point may comprise receiving touch input on a portion of the touch screen displaying the image. The location of the touch input on the image may then be interpreted as a selection of the target point. Similarly, if the system's input devices include a pointing device, such a selection could be made by clicking on (or otherwise selecting) a location on the image with the pointing device.

Alternatives are possible as well. Merely by way of example, the control subsystem (or the computer) might process the image to identify potential target points (using edge detection technology, etc. to identify, e.g., architectural and/or topographic features in the displayed image) and potential target points might be highlighted on the displayed image. The system, then, might provide a facility to allow the operator to scroll through the potential target points using any appropriate input method (such as a scrolling device, a keypad, and/or the like). Optionally, the system might provide controls to allow the user to resize (e.g., zoom) and/or pan the displayed image to cause the system to display the image at a higher resolution and/or an increased detail, to allow the operator to more easily select the target point.

Thus, in some embodiments, identification of a target point can comprise receiving the selection of the target point from the user. As described above, however, other embodiments might employ other techniques for target point selection.

At block 835, the sensing subsystem collects data, e.g. using any appropriate sensor within the sensing subsystem. Merely by way of example, the GNSS device in the sensing subsystem might obtain one or more location fixes, which, as noted above, can be used to infer the position and/or the orientation of the rover, depending on the embodiment. As another example, a compass in the sensing subsystem might measure compass orientation data about an orientation of the rover, one or more tilt sensors might obtain data about a tilt angle of the rover, and/or gyroscope might measure a relative orientation of the rover (e.g., relative to the nearest gravity vector, the prior known orientation, and/or the like) to obtain data about a relative orientation of the rover. This data may be stored on a storage device local to the sensing subsystem, either relatively permanently or relatively transiently, and/or may be transmitted for reception by the control subsystem and/or another computer system (e.g., via a communication interface of the sensing subsystem).

Upon receiving the data (block 845), the control subsystem (or other computer system) calculates one or more azimuths from the rover to the target point (block 850), e.g., based upon the data received from the sensing subsystem. In one aspect, the system calculates multiple azimuths based at least in part on various data obtained from the sensing subsystem. Merely by way of example, once the target point has been identified, the system can determine a directional vector to the target point (relative to the orientation of the sensing subsystem). Thereafter, the system can use the data about the orientation of the rover (including without limitation, orientation data inferred from two or more GNSS fixes, orientation data obtained by compass, orientation data obtained via gyroscope, and/or the like).

Thus, the method 800 may include calculating a true compass azimuth to the target point, based on the compass orientation data and/or a correction factor to account for rod tilt, magnetic declination, and/or the like. In some cases, data from other sensors (such as a tilt sensor, a gyroscope, etc.) may be used to correct a compass azimuth (or any other assessment). The method 800 might further comprise calculating a gyroscopic azimuth, based on an orientation of the rover inferred from gyroscopic data, and/or calculating a GNSS azimuth, based on an orientation of the rover inferred from two or more GNSS fixes. As used herein, the term, "GNSS azimuth," means an azimuth derived from a directional reference of the rover, based on two or more GNSS fixes. Hence, calculating a GNSS azimuth might comprise determining a directional reference of the rover, and then deriving an azimuth to a target point based on that directional reference. Other embodiments may employ other techniques for calculating an azimuth to the target point.

In further embodiments, the rover might calculate an azimuth from captured imagery. For example, as noted elsewhere herein, an image can be analyzed to determine an orientation of the image. Based on this orientation, an azimuth from the position of the rover when the image is captured to any point in the image can be calculated.

At block 850, a preferred azimuth is selected. In a set of embodiments, the system selects the preferred azimuth by comparing each of the calculated azimuths, and/or by analyzing possible error in each of the azimuth calculations to select an azimuth determined to be most reliable out of all the calculated azimuths. Merely by way of example, if the compass azimuth is determined to be unreliable, e.g., because it varies significantly from other calculated azimuths, because magnetic interference was detected, because the tilt angle of the rod introduced unacceptably high error, etc., the system would select another calculated azimuth is the preferred azimuth. In some cases, the preferred azimuth may be inferred from a combination of calculated azimuths (e.g. as an average of two or more calculated azimuths).

In some cases, the method 800 might comprise adjusting the preferred azimuth to produce a selected azimuth (block 855), e.g., by correcting a selected azimuth to account for rod tilt, by applying a correction factor to one calculated azimuth based on other calculated azimuths, and/or the like. The method might also comprise displaying the selected azimuth (e.g., as a compass heading from the rover to the target point, etc.) for the user, via the user interface (block 860). Such a display might be graphical (e.g., as an overlay on a displayed image, textual/numerical, or both. The azimuth to the target point alternatively/additionally might be stored in a data storage device, and/or correlated with an identifier of the target point and/or the location of the rod (e.g., as fields in a database record).

In some cases, the method 800 further comprises measuring the distance from the rover to the selected target point and/or the vertical angle from the rover (or, more precisely, the distance measurement device) to the target point (block 865). Any of a variety of techniques may be used to measure the distance from the rover to the target point. Merely by way of example, in many embodiments, a distance measurement subsystem (and/or, in particular, an EDM subsystem) may be used to measure the distance using well-known techniques. In other cases, passive distance measurement techniques, such as parallax measurements, trigonometric measurements, and/or the like may be used. In such cases, the distance measurement subsystem might transmit the measured distance to the control subsystem and/or a different computer. In other cases, a separate device (including, as a simple example, a tape measure) might be used to measure the distance to the target point, and this measured distance might be input by the user. The measured distance from the rover to the target point may be stored e.g., as an additional field in the database record described above.

In any case, the method 800 might comprise inferring the position of the target point (block 870). In some cases, the inferred position of the target point may be expressed by reference to a known coordinate system, such as latitude/longitude, and/or may be expressed to whatever degree of precision is available and/or desired. A variety of techniques may be used to infer the position of the target point.

Merely by way of example, the position of the target point may be inferred based on the location of the rover, the azimuth from the rover to the target point, and the distance from the rover to the target point. In another embodiment, the rover may be located at the target point, and inferring the position of the target point might comprise determining the position of the rover itself (e.g., using GNSS and/or other techniques). In further embodiments, the position of the target point can be triangulated, for example using measured distances from two or more known locations of the rover to the target point and/or using selected azimuths from two or more known locations of the rover to the target point. (To infer the location of the target point from such solutions, the rover may need to be moved from one location to another, and/or two rovers may need to be used, in which case some or all of the method 800 may be iterated as necessary.) The inferred position of the target point may be stored in a data store, e.g., as yet another additional field in the database record described above.

At block 875, the method 800 comprises displaying information about the position of the target point. Any of a variety of techniques may be used to display information about the position of the target point. Merely by way of example, in some cases, the target point might be highlighted on a display of the control subsystem and/or another computer, and the position of the target point (expressed, for example as a latitude/longitude pair) might be superimposed on the image near the highlighted target point. As another example, a list of several target points, with corresponding positions (and/or other information, such as azimuth/distance from a known rover location) might be displayed in table format on a control subsystem display, computer monitor, and/or the like. One skilled in the art will appreciate, based on the disclosure herein, that a variety of other options are possible as well.

Figure 9A:
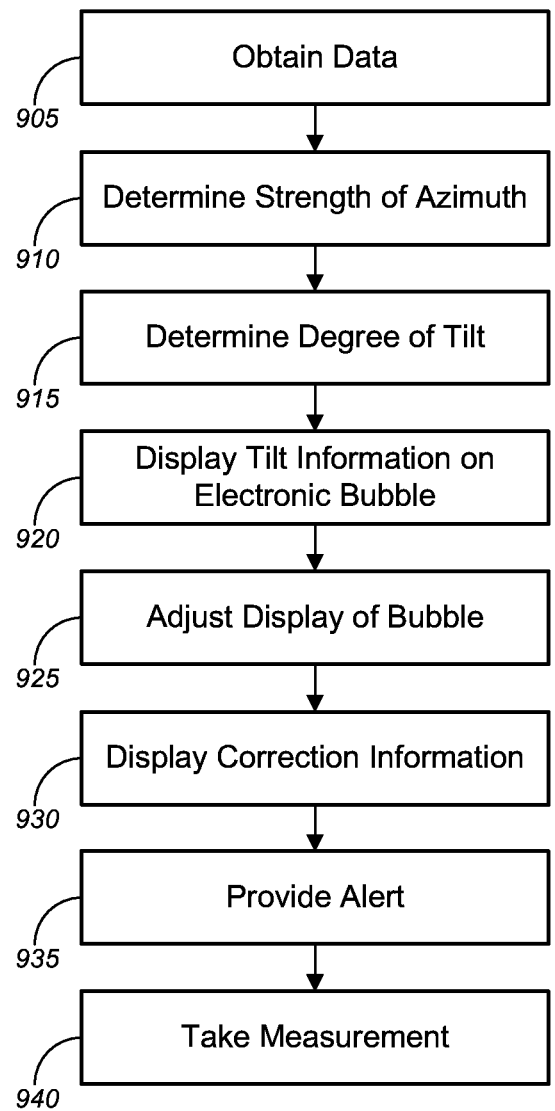
FIG. 9A is a process flow diagram illustrating a method of facilitating position measurements, in accordance with various embodiments.

Certain embodiments provide a variety of features to facilitate the operator's task. In particular, some embodiments can correct for imprecision introduced by operator error, while other embodiments can help guide the operator to perform tasks correctly, rather than merely telling the operator when a task is being performed incorrectly. FIG. 9A illustrates a method 900 that exhibits both of these features. As the discussion above indicates, significant variance of the longitudinal axis of the rod from vertical can introduce systemic error into the calculation of azimuths, rover position, distances, and other parameters, and conventional surveying tools provide facilities (such as a bubble level) to assist the operator in maintaining the rod in a vertical position. Also as discussed above, certain embodiments employ an electronic bubble, which simulates the bubble level of conventional tools. The method 900 of FIG. 9A provides an example of a technique that employs that uses an electronic bubble to enable the operator to perform surveying tasks with less effort and/or less error.

The method 900 comprises obtaining data (block 905), e.g., from a sensing subsystem (for example using the techniques described above). In particular, the system obtains data from which an azimuth can be calculated (using one or more of the techniques described above, for example). Based on this data, the method 900 comprises determining the strength of the azimuth (block 910). For example, a compass sensor might have three magnetometers aligned on three orthogonal axes. Azimuth strength can be affected by deviation from a known earth magnetic field vector length and/or inclination angle. An azimuth strength value of the magnetic compass can be estimated by comparing of the measured magnetic vector with the earth magnetic model. The parameters are the earth magnetic field vector strength and/or inclination angle. A deviation shows reduced azimuth strength. Such deviation can be due to ferrous materials, motors, magnets, and the like proximate the sensor, local geomagnetic anomalies that are not properly modeled, etc. The deviation from the sensor's model can be detected in magnitude and direction, and from that deviation, the strength (uncertainty) of a magnetic azimuth can be calculated. As another example, a relative azimuth computed from a gyroscope needs a zero angular rate measurement when the rover is static for calibration. After calibration, the accuracy of the gyro azimuth degrades over time until the next calibration. If the rate of degradation is known, the strength of the gyro azimuth can be calculated based on the time since the last calibration.

In some cases, a coarse sighting telescope can be included on the rover and can be used to sight to a target within 0.05°. If the target is a known point and the rover is stationed at a known point, the azimuth obtained from the coarse sighting telescope can be used to calibrate a compass or gyroscope, enhance the strength of the compass/gyro azimuth, etc.

At block 915, the method 900 comprises determining a degree of tilt of the rod, e.g., based on data obtained from one or more tilt sensors. In one aspect, the degree of tilt may be considered a vector, having both magnitude and direction (e.g., in two dimensions). The method 900, then, may comprise displaying, with an electronic bubble, information about the tilt of the rod (block 920). FIG. 10A illustrates an electronic display 1000, which includes an electronic bubble 1005, along with a bull's-eye 1010, which indicates whether the tilt of the rod is within acceptable tolerances (i.e., if the electronic bubble 1005 is inside the bull's-eye 1010, the degree of tilt of the rod is sufficiently small to allow for accurate measurement). Because the bubble 1005 can be depicted in two dimensions relative to the bull's-eye 1010, the display 1000 can indicate the degree of tilt in two dimensions. In some embodiments, the display of the electronic bubble is dynamic, i.e., updated in near-real-time to reflect updated data obtained from the tilt sensors, so to provide feedback to the operator as the operator attempts to align the rover.

On its own, the electronic bubble can assist the operator in aligning the rover. Certain embodiments, however, provide further additional functionality with respect to the electronic bubble. For instance, in one embodiment, the method 900 comprises adjusting a display of electronic bubble (block 925). In different aspects, the display of electronic bubble can be adjusted in one or more of several different ways.

Merely by way of example, in some cases, the size of the bubble 1005, relative to the bull's-eye 1010, is modified, based on the determined strength of the azimuth. (This can be changed by modifying the size of the bubble 1005, the size of the bull's-eye 1010, or modifying both.) This feature can provide assistance to an operator of the rover in obtaining accurate measurements: in a typical case, position measurements are relative to the base of the rover; thus, if the rover is not substantially vertical, the top portion of the rover, where the sensing and distance measurement systems typically are located, will be in a different horizontal position than the base of the rover. This error can be corrected by the control system, based on the measured tilt and azimuth of the rover, e.g., as described in further detail below. That is not a trivial operation; for example, tilt sensors does not know in which direction the local coordinate system is. The azimuth of the rover with tilt sensors can be obtained with a magnetic sensor (compass), however. If the azimuth value is reliable (e.g., with an undisturbed magnetic sensor), a relatively large tilt value can still allow calculation of an accurate position of the rover base. In this case, the electronic display might have a large circle and a small bubble, indicating a large range of allowed tilt. If the azimuth is inaccurate (e.g., with a detected magnetic disturbance, due to comparison of the magnetic vector dip angle and magnitude with the model of the earth magnetic field), the leveling must be more accurate, and thus the display might have a larger bubble (and/or smaller ring), such that at small misslevelling, the bubble touches the circle. In this way, the electronic bubble display can indicate to the operator, quickly and easily, both the tilt of the rover and the amount of tilt that is acceptable given the quality of the azimuth data.

Thus, a relatively stronger azimuth, the bubble 1005 can be relatively smaller (as illustrated by FIG. 10A, for example), because position/azimuth calculations are relatively less sensitive to rod tilt (which, depending on the degree of tilt, might be subject to compensating calculations based on tilt sensor output in any event). If the azimuth is relatively weak, on the other hand, the calculations will be relatively sensitive to rod variance from vertical, so the relative size of the bubble 1005 may be larger in comparison to the bull's-eye 1010 (as depicted in FIG. 10B, for example). This indicates to the operator that the rod must be held relatively closer to vertical to allow for accurate measurement (because the same degree of tilt can result in the bubble 1005 being within the bull's-eye if the bubble 1005 is relatively small and the bubble 1005 being at least partially outside the bull's-eye 1010 if the bubble is relatively large, as indicated by FIGS. 10A and 10B).

Alternatively and/or additionally, the display may be modified to indicate when the rod is sufficiently aligned with the vertical. For example, the display might be modified to change the bubble 1005 and/or the bull's-eye 1010 to a different color when the degree of tilt is acceptable for measurements. Alternatively and/or additionally, other visual aspects of the display (such as a fill pattern, line weight or style, etc.) might be modified to indicate the tilt status of the rod. In some cases, certain aspects of the electronic bubble display, such as the size of the bubble, the size of the ring (and/or the size of the ring relative the bubble), and/or the rate of movement of the bubble (to correspond with the changing tilt of the rod) can be set by user preference.

In another set of embodiments, the display of the electronic bubble can be adjusted by displaying correction information in addition to (or as an alternative to) the display of the electronic bubble (block 930). FIG. 10C, for example illustrates an electronic bubble display 1000 that comprises a correction information display 1015, which indicates a direction in which the top of the rod should be moved to place the rod in a vertical position. This correction information 1015 might be updated dynamically as the operator moves the rod, to enable the operator to "zero in" on the correct rod position, which will place the bubble 1005 within the bull's-eye 1010.

In some cases, as illustrated by FIG. 10D, the display may be modified to indicate conditions in which the compass and/or tilt sensors are unreliable (e.g., by displaying the bubble 1005, bull's-eye 1010, and/or correction information 1015 to appear fuzzy, etc.). Such unreliability might be the result of magnetic interference, wind, vibration, user-induced jitter, etc. Merely by way of example, vibration can disturb the tilt sensor(s) and thereby increase the standard deviation of the sensor data. In such cases, the shape (and/or other aspects) of the bubble and/or other display elements might be modified to indicate the amount of noise in the tilt sensor readings.

In many cases, the operator's task is made more difficult by the need to watch the bubble while trying to perform a measurement, keep a reticle centered on a target point, etc. Certain embodiments can alleviate these difficulties in a variety of ways. For instance, in some cases, the system might provide an alert (such as an audible tone, etc.) when the rod is properly leveled (i.e., is vertical to within applicable tolerances) and/or, alternatively/additionally, when the tilt of the rod goes outside tolerances for measurement (block 935). This functionality can allow the operator to operate the rover without the need to regularly check the position of the electronic bubble. In other embodiments, the system might be configured to automatically take any needed measurements at the point the operator achieves proper alignment of the rod (block 940).

Figure 9B:
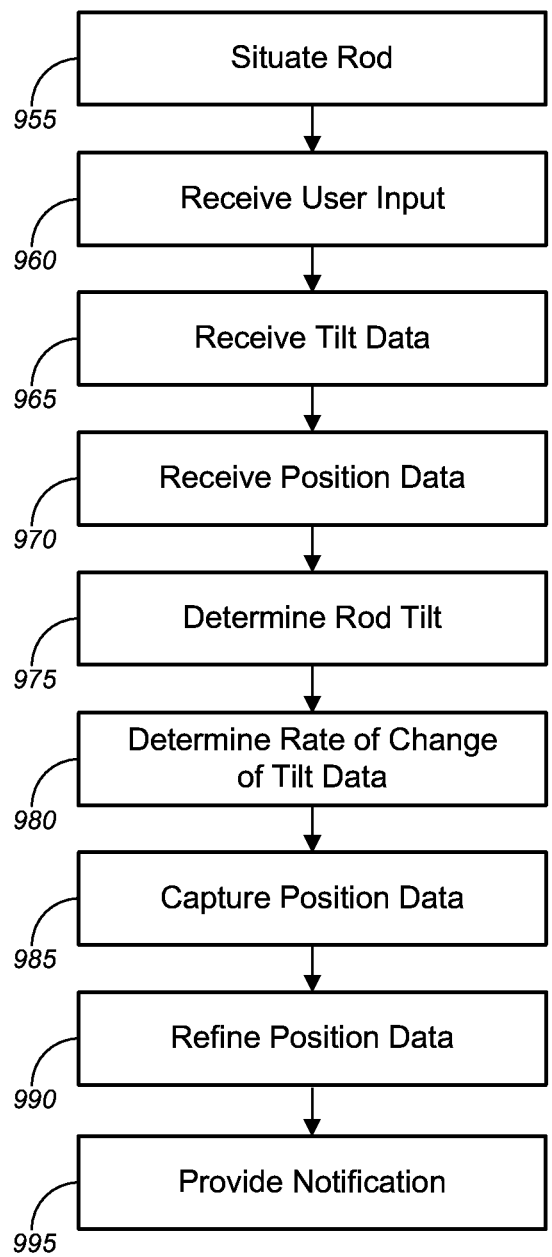
FIG. 9B is a process flow diagram illustrating a method of taking a position measurement automatically, in accordance with various embodiments.

Merely by way of example, FIG. 9B illustrates a method 950 of taking a position measurement automatically based on rod alignment. The method 950 comprises, at block 955, situating a position measurement system (such as one of the rovers described herein) at a chosen location. In some embodiments, the method 950 comprises, at block 960, receiving user input (e.g., via a user interface, such as one of the interfaces described herein, via a dedicated button, etc.) instructing the system to take a position measurement (i.e., to collect position information about the current location of the rover).

In one aspect, this user input might activate the system to begin the process of taking an automatic position measurement when the rover is within tilt tolerances. (In other cases, such user input might be unnecessary.) Hence, the system might begin collecting tilt data from the tilt sensor and position data from a position measurement device (e.g., a GNSS receiver). Alternatively, the system might begin collecting data from a gyroscope, which can be used to determine the stability of the rod in a particular position. In an aspect, the sensors collect this data and provide it to the control subsystem (which, as noted above, can be integrated with either of these sensors and/or can be a separate device), which receives the tilt data (block 965) and/or receives the position data (block 970). In one aspect, this data can be continually collected by the respective sensors and provided to the control subsystem.

The system then determines, based on the tilt data, whether the tilt of the rover (or more precisely, the tilt of the longitudinal axis of the rod) falls within a specified tolerance from vertical (block 975). In an aspect of some embodiments, the operator might be given the option to specify (e.g., through a user interface) the value of the tolerance from vertical, depending on local conditions and/or the operator's judgment and/or needs (e.g., in terms of position measurement precision). In other cases, the tolerance might be configured within the device based on device performance characteristics, without providing the operator to set the tolerance. In either case, a number of different tolerances might be appropriate. In some cases, for example, a rod tilt of 5 degrees or less might provide sufficient precision in the position measurement. In other cases, a tolerance of 2 degrees might be appropriate, while in still other cases, the tolerance might be 1 degree, 0.5 degrees, 0.1 degrees, or any other suitable value.

Whatever the specified tolerance, within this tolerance, position measurements can be considered to be reliable, while outside this tolerance, the rod tilt can affect the position measurement sufficiently to render the position measurement unreliable. Alternatively or additionally, in some cases, the system might measure the noise in the tilt measurement (which can be expressed as the rate of change of the tilt measurement (standard deviation)) and determine whether this noise falls within a specified threshold rate (block 980). For instance, a noisy tilt measurement might indicate that the operator is not holding the rod steady, such that any latency in the tilt measurement might cause the system to capture position data when the tilt is significantly different than the measured tilt, rendering such a position measurement unreliable. Such noise can be measured based on the tilt sensor data itself (by analyzing a rate of change of the data, for example). Alternatively and/or additionally, input from other sensors, such as a gyroscope, can be used to determine the stability of the rod (which necessarily will have an impact on the noise in the tilt data). If this measured stability is within a specified tolerance, the system might determine that a reliable position measurement can be captured (so long as the rod tilt itself is within acceptable parameters, as described above).

Hence, at block 985, when the system determines that the tilt of the rod falls within the specified tolerance and/or that the noise in the tilt measurement is acceptable (i.e. that the rate of change of the tilt measurement is less than a threshold rate) or any other indicators of rod stability fall within threshold values, the system captures position data (which describes the current position of the position measurement system). In an aspect, the control subsystem might capture position data received from the position measurement device by storing that position data on a storage device, as described herein.

A number of different techniques can be used to capture the position data. Merely by way of example, the position measurement device might continually collect position data (e.g., with a sample rate specified by the collection frequency), for example, from the point at which the user provides input requesting a position measurement and/or the point at which the tilt of the rod falls within an acceptable tolerance, and provide that data to the control subsystem; in such cases, the control subsystem might receive the position data as it is provided but only capture and store position data when the tilt and/or the noise in the tilt measurement fall within specified parameters. In a particular aspect, the control subsystem might wait to capture position data until the tilt data and/or the tilt measurement noise have remained within acceptable tolerances for a period of time (such as the collection frequency of the position measurement system) that allows the collection of sufficient position data to provide an accurate measure of the position of the base of the rod. Alternatively, the position measurement device might be instructed to send position data to the control subsystem only after the system has determined that the tilt and/or measurement data is satisfactory.

In yet other embodiments, the method 950 might comprise refining the captured position data (block 990). Merely by way of example, the system might collect multiple position fixes, before, during, and/or after determining that the rod is stable within the specified tolerance (because, as noted above, the control system might receive position data continuously and/or periodically), and such additional position fixes can be used to refine the position data that is captured. As a specific example, the control subsystem might collect one or more pre-measurement position fixes before the rod tilt is within the specified tolerance (and/or before rod stability meets threshold criteria), one or more position fixes while the rod tilt and stability are acceptable (within tolerances), and/or one or more post-measurement position fixes after the rod tilt and/or stability have departed from acceptable tolerances. Any of such measurements can be used to refine the captured position data. For example, in many cases, the motion of the position determination device can be considered to describe a portion of a sphere around the base of the rod. All data of positions and corresponding tilt data can be used to calculate the center of the sphere, which is the base of the rod. A longer observation time, allowing averaging of different multipath effects between the position and tilt data, can allow refinement of the calculated position of the base.

Certain embodiments can be sensitive to the collection frequency of the position measurement device relative to the frequency of the tilt data. For example, as noted above, in some embodiments, the collection of the position data and the collection of the tilt data might be synchronized, so that position data and tilt data are captured at the same time (or within an allowable interval of time), to ensure that the collected position data can be correlated with the correct tilt data. In some cases, multiple tilt consecutive readings might be averaged to reduce noise in the tilt values. For example, the tilt sensor might collect tilt data a 1 Hz, 10 Hz 50, Hz, etc., and collected data might be averaged over 0.1 seconds to 1.5 seconds to capture a tilt value. The captured tilt data, then, might have latency in this range. Accordingly, the position data might be collected at a fairly high frequency, depending on the latency in the tilt data, to ensure that one or more position fixes can be captured while the tilt data and/or gyroscope data (establishing that the tilt and/or stability of the rod are within acceptable parameters) remain valid. Thus, in some embodiments, the position determination device (e.g., a GNSS receiver) might collect, and/or provide to the control subsystem, position data at a frequency of at least 5 Hz (i.e., 5 position fixes per second), 10 Hz, 50 Hz, or any other appropriate value. Similarly, the control subsystem might capture a tilt value from the tilt sensor with a latency of no more than 1.5 second, with a latency of no more than 1.0 seconds, with a latency of no more than 0.1 seconds, with a latency of no more than 0.05 seconds, or any other rate that is acceptable for measurement purposes and can be sustained by the tilt sensor.

At block 995, the method 950 can include providing a notification to an operator of the position measurement system. In accordance with different embodiments, notifications can be provided using various techniques, including without limitation the audible and visual notifications described above in the context of alerting the operator to when the rod is sufficiently vertical. Merely by way of example, in some embodiments, the system might provide one or more audible notifications, such as a beep, a signal tone, a simulated voice notification, etc. Alternatively and/or additionally, the system might provide visual notifications, such as illumination of an indicator light (LED, etc.), display of a textual and/or graphical indicator on the display of the control subsystem (and/or the display of the rover generally), display of a textual and/or graphical indicator on an electronic bubble display, etc. Such indicators might include flashing of the display, a message (such as "POSITION CAPTURED"), display of an icon, and/or the like.

Similarly, notifications can be provided to the operator in response to various conditions. Merely by way of example, the system might provide a notification to the operator when the rod is sufficiently vertical (i.e. within the specified tolerance of vertical) to allow measurement. Alternatively and/or additionally, the system may provide notification to the operator after the position data has been captured, e.g., to indicate the operator that the rod can be moved at that point. In some cases, the system might provide notifications under each of these conditions. A variety of different types of notifications are possible. For instance, the system might begin transmitting an audible notification as soon as the rod has achieved position within the specified tolerance of vertical, and continue to transmit the notification (either continuously or periodically) until the position data has been captured, at which point the system might cease transmitting the notification and/or my transmit a different notification (e.g., a different tone, a visual notification, etc.) Alternatively, the cessation of the audible notification might itself service notification to the operator that positioned it has been captured and that the rod, therefore, can be moved.

As an alternative, or addition, to automatically taking a position fix when the rod is within a specified tolerance of vertical, some embodiments can correct for tilt in the rod when taking a position measurement. For example, if the rod is vertical when a position measurement is taken with a GNSS receiver, the position of the base of the rod (where the rod touches the ground) can be expressed as the measured position of the GNSS receiver (i.e., the position of the antenna phase center of the GNSS receiver) plus the distance from the GNSS receiver to the base of the rod (i.e., the point at which the rod touches the ground, which is the point of interest for which a position measurement is sought).

In a more general case, when the rod is not strictly vertical at measurement, this distance from the antenna phase center of GNSS receiver to the base can be thought of as the sum of vectors in each of three dimensions. For example, by reference to FIG. 11A, for a rover 1100 in a three dimensional coordinate system with x and y lateral dimensions and a z vertical dimension (i.e., with the z dimension representing the gravity vector), the position of the base 1105 can be expressed as $(x_b, y_b, z_b)$ and the measured position of the position measurement device 1110 (e.g., the position of an antenna phase center of a GNSS receiver) can be expressed as $(x_0, y_0, z_0)$. The position of the base 1105 can be related to the position of the position measurement device 1110 as follows:

$$x_b = x_0 + \vec{d_x} \quad \text{(Eq. 1)}$$

$$y_b = y_0 + \vec{d_y} \quad \text{(Eq. 2)}$$

$$z_b = z_0 + \vec{d_z} \quad \text{(Eq. 3)}$$

The values of these vector components can be determined from the known distance, r, from the measured position $(x_0, y_0, z_0)$ of the position measurement device 1110 to the base of the rod 1105, along with the tilt angle of the rod, θ, and the azimuth of the tilt, which can be expressed as an angle, φ. The tilt angle, θ, can be determined, as described herein, based on input from a tilt sensor in the rover 1100. The azimuth of the tilt, φ, can be determined from a compass (or other azimuth-determination technique), also as described herein.

Figure 11A:
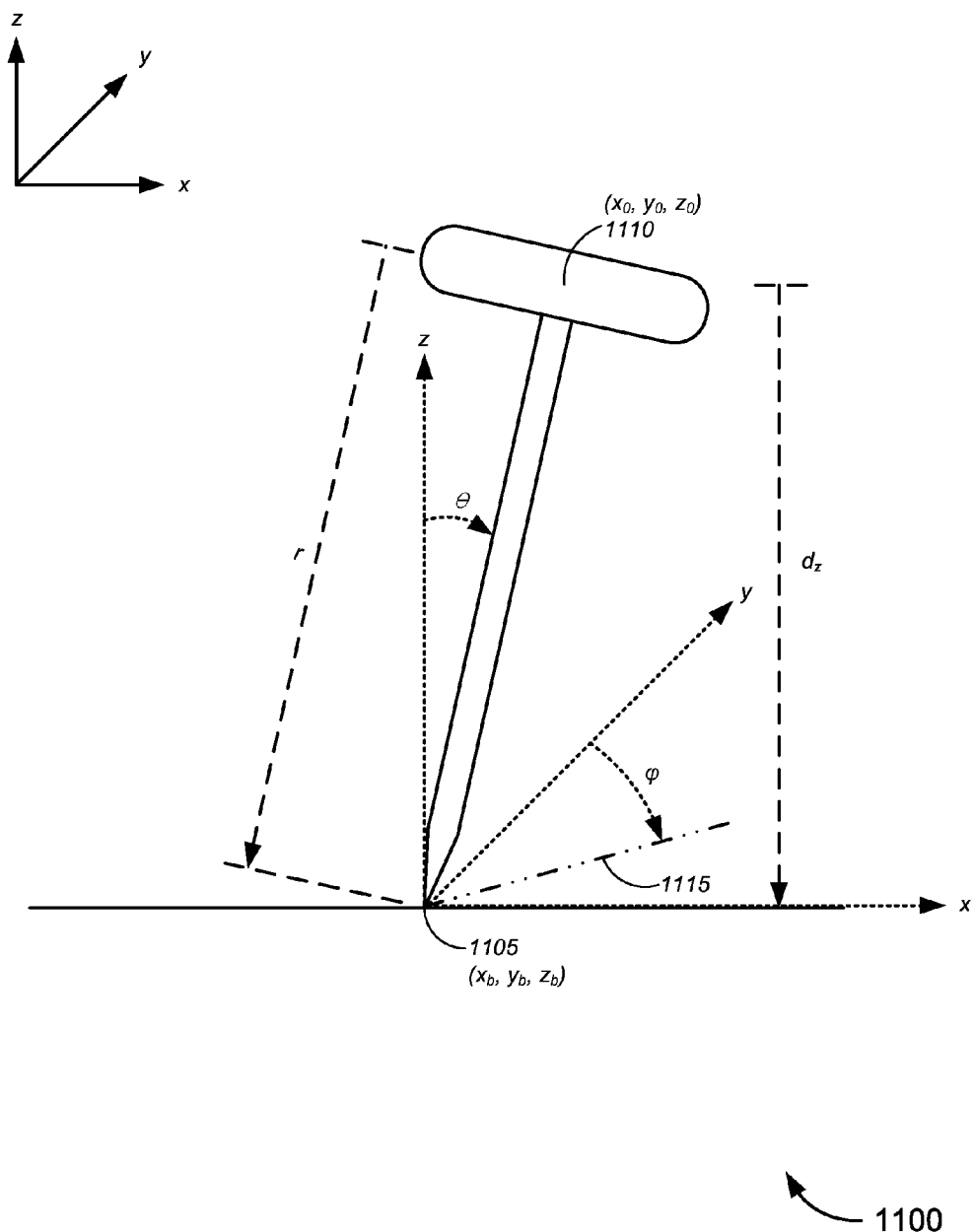
FIGS. 11A and 11B illustrate a technique for determining a position of a base of a position measurement system, in accordance with various embodiments.
Figure 11B:
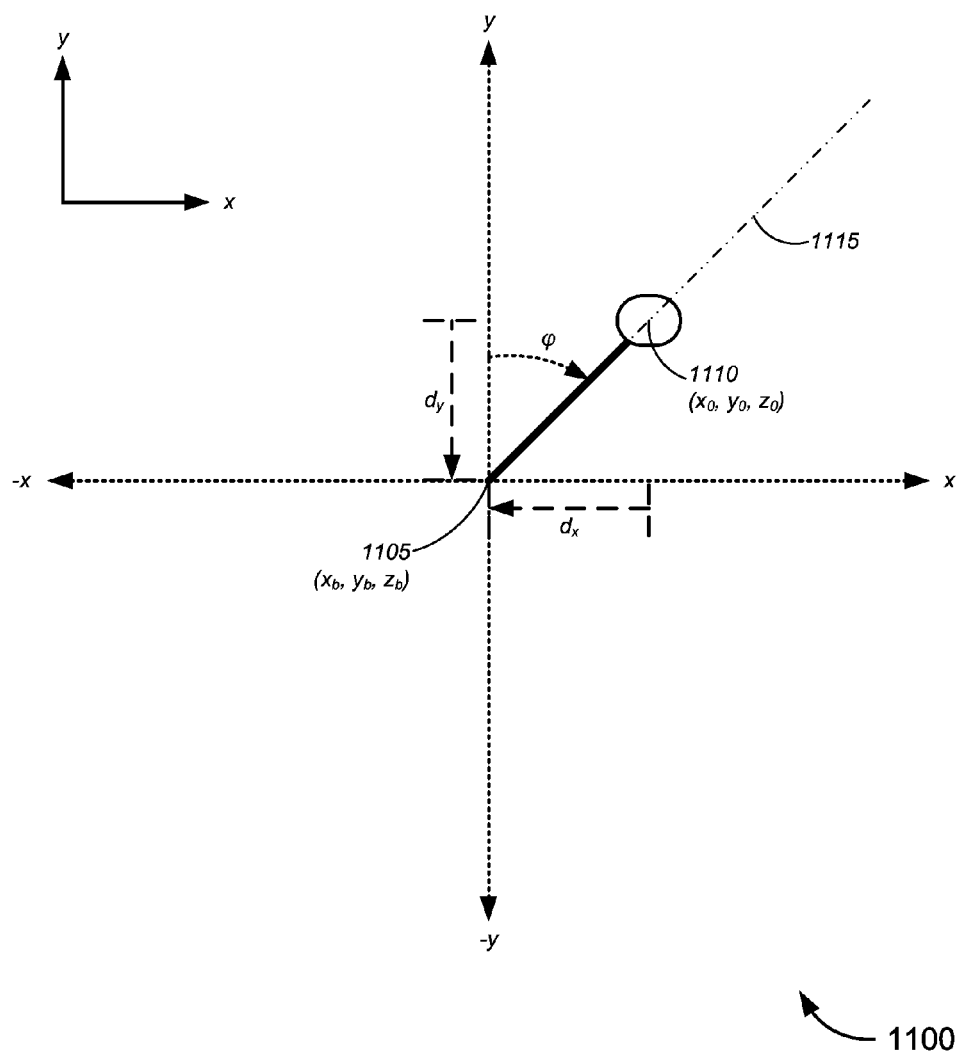

The azimuth of the tilt can best be understood by reference to FIGS. 11A and 11B in conjunction. As shown in FIG. 11A, the projection of the rover's tilt onto the x-y plane falls along an azimuth 1115. FIG. 11B, which shows a bird's eye view of the rover 1100 (and, for ease of illustration, is not drawn to scale), shows this same azimuth 1100. The angle ω describes an offset angle between the azimuth of the tilt and the y-axis (which might represent true or magnetic North in a global coordinate system, for example, but which might also be arbitrarily defined in a local coordinate system).

The vector values for $d_x$, $d_y$, and $d_z$, then, can be expressed as follows:

$$\vec{d_x} = -r \cdot \sin\theta \cdot \cos\varphi \quad \text{(Eq. 4)}$$

$$\vec{d_y} = -r \cdot \sin\theta \cdot \sin\varphi \quad \text{(Eq. 5)}$$

$$\vec{d_z} = -r \cdot \cos\theta \quad \text{(Eq. 6)}$$

These equations can be applied to Equations 1-3, respectively, to determine the position of the base, expressed as $(x_b, y_b, z_b)$ in the coordinate system in use. This correction technique can be used to determine a position of a point of interest at the base 1105 of the rover 1100, even if the rover 1100 is not in a vertical position when the measurements are taken. This correction can be used in conjunction with, or independently of, other techniques and apparatus described herein. Merely by way of example, this correction technique can be used with the measurement technique of FIG. 9B, such that the rover might take an automatic measurement when the rod is nearly vertical, with any necessary corrections applied to that measurement. Such a technique, for example, can allow for a higher tolerance in tilt angle to provide a measurement of sufficient precision.

Another set of embodiments allow for photogrammetric analysis using a rover or other position measurement device. For example, if a rover captures two or more images from different positions, and the positions of two (or sometimes three) or more common points in each of the images are determined (using the techniques described above, for example), the position of any other point in the image can be determined photogrammetrically. Merely by way of example, stereo photogrammetric techniques can be used, such that the coordinates of the same object point identified in two or more images can be calculated using known photogrammetric techniques. Similar techniques can be used to orient the image itself. Orientation of the image can include, without limitation, determination of a position from which the image was captured, a horizontal azimuth (relative to North or a local coordinate system of the image capture device) when the image was captured, a vertical angle of the image capture device when the image was captured, and a rotational angle of the image capture device when the image was captured. The orientation of a captured image can be performed by comparing the known positions of reference points in one or more reference images with known orientations with positions of those same reference points in a captured image. Once the images have been oriented, the location of any point captured in both of those images can be determined photogrammetrically.

For optimal results, the geometric strength of the rover positions with respect to the object point is important. A good strength can be obtained, for example, when the rays from the rover positions intersect in the object point under large angles (e.g., 70-120°). If all images containing the object point are captured from rover positions on one side of the object point, such that the angle of the ray intersection in small (e.g., <20°), the geometric strength of the rover positions can be considered bad in some cases.

A number of photogrammetric techniques (including techniques described as "bundle adjustments," which can be used to orient mosaics of photographs with each other and/or with a coordinate reference system) can be used in accordance with various embodiments. For example, International Publication No. WO/2010/080950A1, filed Jan. 8, 2010 by Graesser and titled "Methods and Systems for Determining Angles and Locations of Points;" U.S. patent application Ser. No. 13/167,773, filed Jun. 24, 2011 by Wang et al. and titled, "Method and Apparatus for Image-Based Positioning"; U.S. patent application Ser. No. 13/397,445, filed Feb. 15, 2012 by Soubra et al. and titled "Determining Tilt Angle and Tilt Direction Using Image Processing"; U.S. patent application Ser. No. 13/794,012, filed Mar. 11, 2013 by Briggs et al. and titled "Workflow Improvements for Stakeout"; U.S. patent application Ser. No. 13/922,772, filed Jun. 20, 2013 by He et al. and titled "Use of Overlap Areas to Optimize Bundle Adjustment"; and U.S. patent application Ser. No. 13/954,995, filed Jul. 13, 2013 by Weisenburger and titled, "Sequential Rolling Bundle Adjustment" (the disclosure of each of which is incorporated herein by reference and which are referred to herein as the "Incorporated Applications"), describe various tools and techniques for performing image-based (e.g., photogrammetric) position measurement, including bundle adjustment operations, and the rovers described above can be used to capture images for such techniques, and/or to perform the techniques themselves. In other cases, an office computer might perform such techniques and calculations in furtherance of methods described herein. In fact, certain embodiments can allow for determination, in the office, of target points not measured in the field, reducing the need for expensive return trips to the field to gather more position data.

Figure 12:
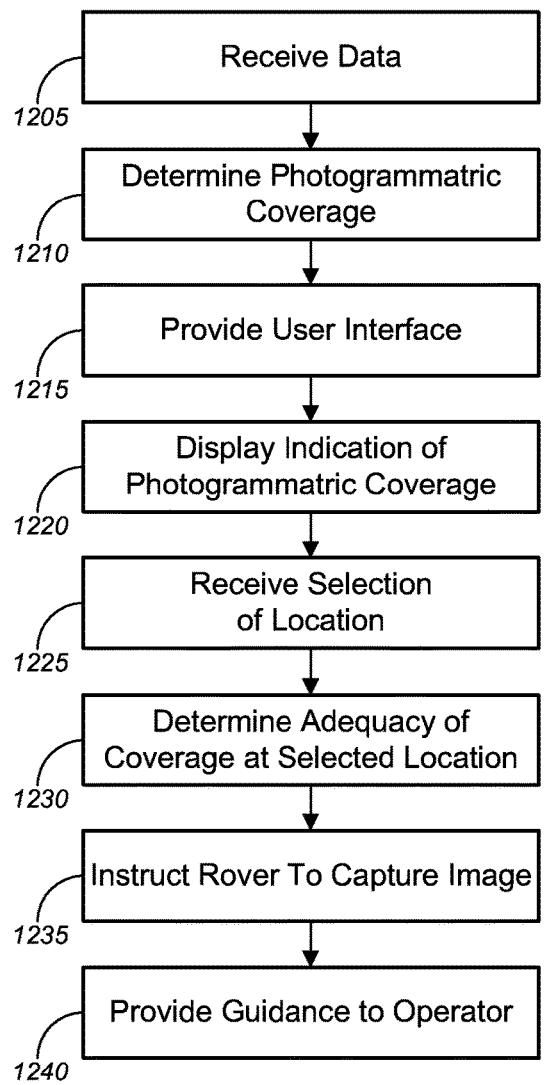
FIG. 12 is a process flow diagram illustrating a method of providing an indication of photogrammetric coverage, in accordance with various embodiments.

To that end, FIG. 12 illustrates a method 1200 of providing an indication of photogrammetric coverage, in accordance with certain embodiments. In particular aspects, the method 1200 can inform a decision of whether a particular area has sufficient images on file to perform photogrammetric analysis, and if not, can provide guidance (and/or instructions to a rover) on where additional images should be captured to improve photogrammetric coverage.

The method 1200 comprises receiving (e.g., at a computer system, such as a rover's control subsystem, an office computer, etc.) image data from one or more image sources, such as an image capture subsystem of a rover (block 1205). In one aspect, the image data comprises data representing a plurality of panoramic images. In another aspect, the image data includes metadata correlated with each of the panoramic images. Merely by way of example, the metadata for each image might include a timestamp indicating the date/time the image was captured, a location of the rover (or other image capture device) that captured the image, and/or an orientation of the rover/image capture device when the image was captured. In some cases, the effective radius of the captured image (measured radially from the location of the image capture device) at which the objects in the image are of sufficient resolution to perform photogrammetric analysis, and/or the panoramic field of view (referred above as a) may be transmitted as metadata to the captured images. In other cases, the system might be programmed with default values for one or more of these parameters. The image capture data might be received in bulk, or it might be received progressively, e.g., as a rover captures images at different locations on a job site throughout the day.

The coverage and geometry can be displayed not only with an effective radius, but also continuously. For example one embodiment might display the survey site represented as an aerial image on the display screen. That image might be greyed out until the rover shoots a panorama. At that point, the background image appears slightly, but is covered by a translucent gray overlay, indicating that some imagery is available, but that the imagery is not ideal. The gray overlay might become more transparent (and eventually disappear) in a particular region, as more imagery of that region is captured from various rover positions and/or at short distances. The gray overlay might not disappear completely for regions in which the imagery is suboptimal (for example, at large radiuses from the rover positions when images are captured, or where few images have been captured). This can indicate to the operator regions of which more imagery is needed for acceptable photogrammetric analysis, and as the operator moves to those regions and captures additional imagery, the control system can progressively remove the gray overlay from such regions as appropriate.

Using this data, the photogrammetric coverage of an area of interest can be determined (block 1210). Merely by way of example, if the location and orientation of a panoramic image are known, the area of photogrammetric coverage can be determined by identifying an area within the panoramic field of view and the effective radius. For a plurality of images, these areas can be combined to determine an overall area of photogrammetric coverage for a given area.

Often, a user will want to see, for a given area (such as a job site) the existing area of photogrammetric coverage. Accordingly, the method 1200 might comprise providing a user interface (block 1215), e.g., as described above, on a rover control subsystem's display screen, office computer, and/or the like, and/or displaying, via that user interface, an indication of photogrammetric coverage (block 1220).

Figure 13:
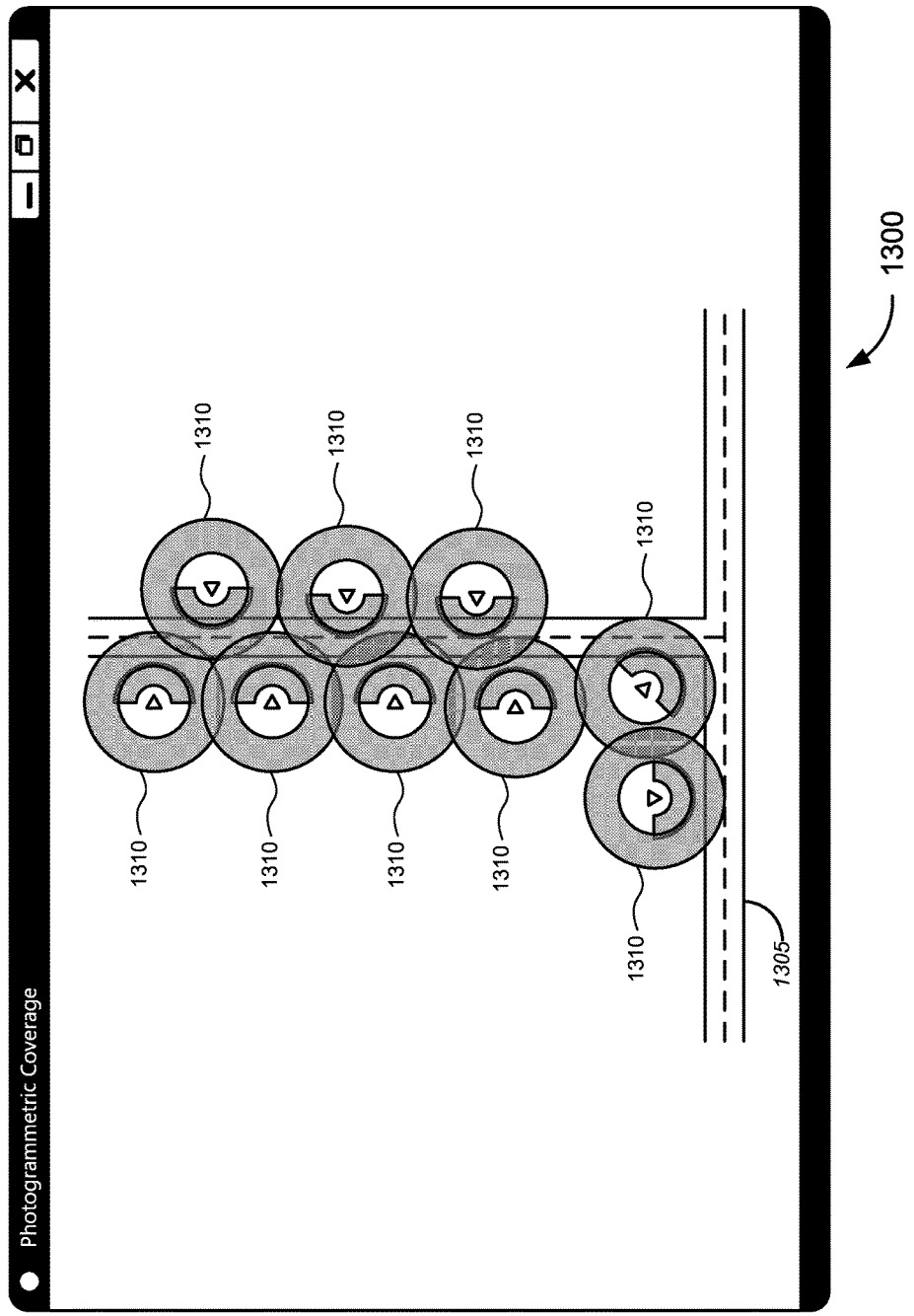
FIG. 13 is an exemplary screen capture diagram illustrating a user interface for displaying an indication of photogrammetric coverage, in accordance with various embodiments.

FIG. 13 illustrates one example of such a screen display 1300. On the exemplary screen display 1300, a plan view of a job site (or other area of interest) 1305 is displayed, comprising two streets. Such a plan view might comprise, for example, a satellite view of the area, such as those provided by Google Maps™ and the like. Superimposed on that image are multiple designators 1310 indicating areas of photogrammetric coverage. In the illustrated example, each image was captured by a rover having two sets of cameras, including one that provides a 360° panoramic view and one that provides a 180° panoramic view with a tighter radius. The shaded area of each designator 1310 indicates an area of photogrammetric coverage, and the collective shaded area of the plurality of designators indicates the overall area of photogrammetric coverage on the job site.

Using a display such as that depicted by FIG. 13, an operator can identify areas in which photogrammetric coverage is sufficient (such that positions of target points within those areas can be determined photogrammetrically, and areas in which the photogrammetric coverage is insufficient.

In some cases, this display may be interactive, such that the user can identify a point, within the job site image, for which the user would like to perform photogrammetric analysis. Hence, returning the FIG. 12, the method 1200 might further comprise receiving a selection (block 1225), via the user interface, of a location within the plan view image of the job site. The selection of the location within the image may be accomplished in much the same way as a target point is selected via a user interface, as described above. Upon receiving the selection of the location, the system may determine whether the existing captured images for that general area (or job site) provide adequate photogrammetric coverage of the selected location (block 1230). (In some cases, the selection of the target location and the determination of the adequacy of photogrammetric coverage of that location may be performed without displaying areas of photogrammetric coverage on the plan view of the job site.)

If the system determines that the photogrammetric coverage of the selected location is adequate, it may proceed to perform photogrammetric analysis of one or more of the captured images to determine a position of the selected location. On the other hand, if it is determined that the photogrammetric coverage is insufficient, the system might inform the user of that fact. In some embodiments, the system may offer the user an option to request additional image(s) of the area, in order to provide sufficient photogrammetric coverage. If the system receives user input requesting additional images, it may transmit an instruction to a rover to capture a panoramic image at a location and/or orientation that ensure sufficient photogrammetric coverage of the target location (block 1235).

Upon receiving the instruction (e.g., from an office computer system), or, alternatively, directly from the operator (e.g., if the method 1200 is performed at a rover's control subsystem), the rover may provide guidance to an operator to allow the operator to transport the rover to the specified location (block 1240), so that the image can be captured. Merely by way of example, the control subsystem of the rover might determine its present location (e.g., using a GNSS device in a sensing subsystem) and/or a path to the specified location. The control subsystem, then, might provide directions (e.g. using a display screen or other user interface device) for the operator to drive, walk, etc. to the specified location. Upon reaching the specified location, the control subsystem might guide the user to position the rover in the appropriate orientation, at which point the control subsystem can instruct the image capture subsystem to capture panoramic image (which includes the target location), either automatically and/or upon user input.

FIGS. 14-17 illustrate methods that can be performed, e.g., by a rover in the field to determine positions of objects of interest. It should be appreciated that certain portions of these methods could alternatively and/or additionally be performed by other system components (e.g., by an office computer), but in a novel aspect of certain embodiments, a rover can be capable of performing such methods on its own, without requiring the use of additional systems or processing power. In particular, a control system of a rover can be programmed with software for performing the computational operations described herein.

Figure 14:
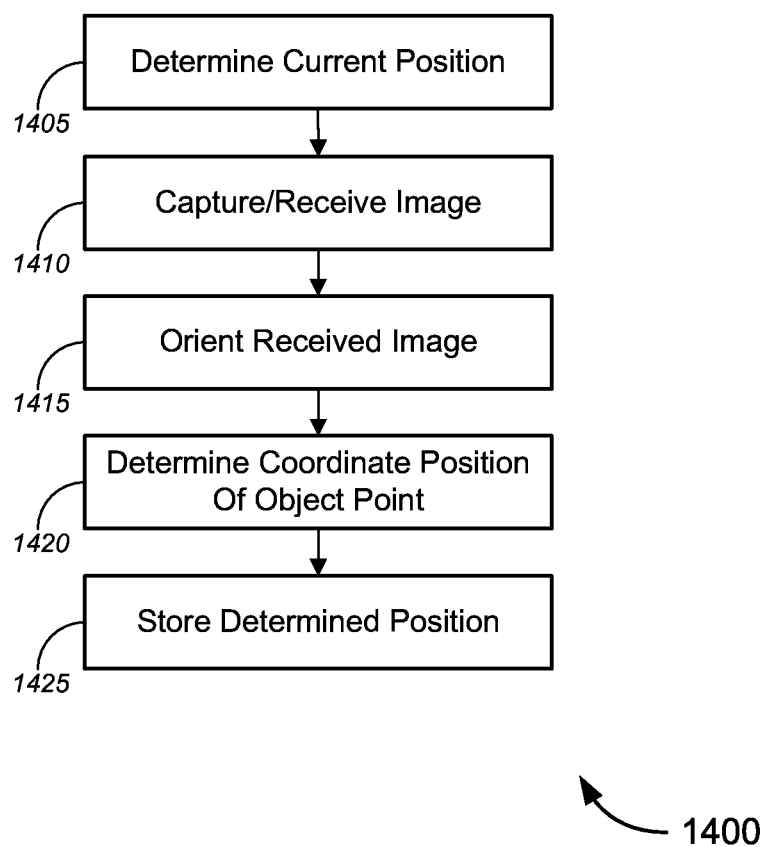
FIGS. 14-18 are process flow diagrams illustrating methods of determining positions of objects of interest, in accordance with various embodiments.

Merely by way of example, FIG. 14 illustrates a method 1400 that can be performed by a rover having an imaging system and a control system to determine positions of points of interest. At block 1405, the rover determines its current position. As noted above, a rover's position and/or orientation (e.g., with respect to magnetic north, a local coordinate system, and/or the vertical) can be considered the rover's "station." There are a variety of techniques (many of which are disclosed above) by which a rover can determine its current position.

For instance, as described in detail above, a rover can include a sensing subsystem, and input from the sensing subsystem (and/or one or more components thereof) can be used to determine the position of the rover. Merely by way of example, the sensing subsystem may comprise a GNSS device, and data received by the control system from the GNSS device can be used to determine the position of the rover. As another example, a traditional back sighting technique can be used, in which an EDM system can be used to determine a distance and/or vertical angle to a known reference point, and in azimuth determination device can be used to determine an azimuth to the known reference point; from this data, the position of the rover can be determined. Alternatively and/or additionally, an EDM system can be used to back sight to two or more known reference points, and a "distance-distance" solution can be computed to determine the position of the rover. As other examples, the rover might include an optical target (e.g. a prism, etc.) that another device can use to (e.g., a Total Station) visually locate the rover; the rover might also comprise a radio that can receive from the other device coordinates indicating the position of the rover, as calculated by the other device. As yet another example, the current position of the rover can be determined photogrammetrically from captured imagery, using techniques described herein. Any device (or combination of devices), such as those described above that can be used to determine a position solution for the rover can be considered a "position determination device." In another embodiment, the rover might use an image captured from a particular position to determine a photogrammetric resection solution for that position, e.g., using a technique described in further detail below.

At block 1410, the method 1400 comprises capturing an image (e.g., using an imaging subsystem, as described above). In one aspect, the image includes the object of interest. At block 1415, the method 1400 includes orienting the received image (e.g., determining the orientation of the received image). In one aspect, the orientation of the received image comprises two data elements: the azimuth (e.g., relative to magnetic North, a local coordinate system, etc.) of the rover (or an aspect thereof, such as the projection center of the of the imaging subsystem (and/or of a lens thereof) when the image was captured, and a tilt of the rover (and/or of the imaging subsystem) when the image was captured, which can be expressed as both a vertical angle and an azimuth of tilt. (Assuming the image capture system has a fixed orientation with respect to the rod, the tilt of the rod can be used to derive the tilt of the imaging subsystem.) Together with the rover position, this orientation can be considered the rover's "station" when an image is captured. A number of techniques can be used to orient the image, including various techniques that photogrammetrically determine the station of the rover at the time the image was taken. In another aspect, the position of the rover itself might be determined using data from a position determination device, while the other aspects of the image orientation might be determined photogrammetrically based on the imagery itself; this determined position and image orientation can be combined to determine the station when the image was captured.

Figure 15:
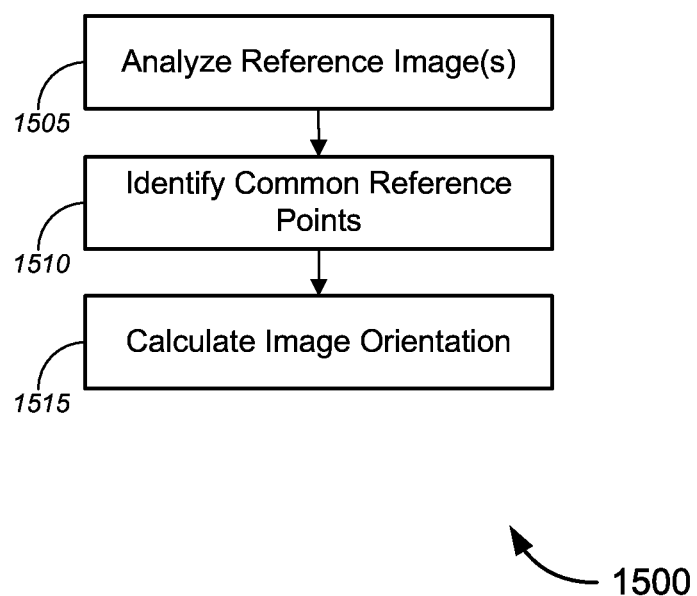

As an example of a technique to orient the image (and/or can be used, with a position solution, to determine the station of the rover itself), FIG. 15 illustrates a method 1500. In block 1505, the method 1500 comprises analyzing one or more reference images. In an aspect, each of the reference images might have been captured (e.g., by the rover) from a different position, and in particular, from a different position than the current position of the rover. (It should be noted, of, course that the distinction between a "reference image" and the "captured" or "received" image is semantic—in a group of images, any one can be considered the received image, which can be oriented and/or used to determine object positions, while the others can be considered reference images—thus, the terms largely are interchangeable and are used distinctively herein only for purposes of clarity.) In another aspect, all of the images might share in common at least a portion of the field of view (i.e., the capture panorama) of each respective image, including in particular one or more reference points. Such reference points can be any feature that is distinct in each image (such as a distinctive terrain future, man-made structure, etc.), which need not necessarily have a known position, referred to herein as a "tie point". Alternatively and/or additionally, one or more of the reference points can have a known position (e.g., a position determined previously using one or more the techniques described herein). An object point can be considered a reference point if that point is used as a tie point.

The method 1500, therefore, comprises identifying, in each of the reference images and the captured image, one or more common reference points (block 1510). Such identification can include determining a location of each reference point in each image and/or a pixel coordinate of each reference point in each image. From the locations of these common reference points in each of the images, the orientation (e.g., the azimuth and tilt) of the captured image can be calculated (block 1515). Merely by way of example, the orientation of the image can be calculated by determining the positions (e.g., using techniques such as those described herein and in the applications incorporated by reference) of three or more tie points captured in two or more reference, which were captured from known positions (and/or which might, but need not necessarily, have known orientations), along with the captured image, which was also captured from a known position (e.g., a position determined as described above). Using the positions of these tie points, the orientation of the received image can be calculated based on the locations of the tie points in the received image, using similar techniques. Alternatively and/or additionally, if one of the reference points already has a known position, that point can be used as a back sight point in the analysis of the received image; the location of that known reference point, together with location of the object point (or another tie point), in the reference image(s) and the captured image can be used to determine the orientation of the captured image.

Returning to FIG. 14, the method 1400 might further comprise, at block 1420, determining the coordinate position of the object point (i.e., the actual position of the object point in the real word, generally referenced against a global or local coordinate system, as compared with a "pixel coordinate," which refers to the pixel location of the object point in a captured image), based on the location of the object point in the (oriented) captured image, as well as one or more (and, in some cases, two or more) reference images, which might be oriented as well. Here, the term "oriented" is used to refer to an image the orientation of which has been determined, e.g., as described above.

Figure 16:
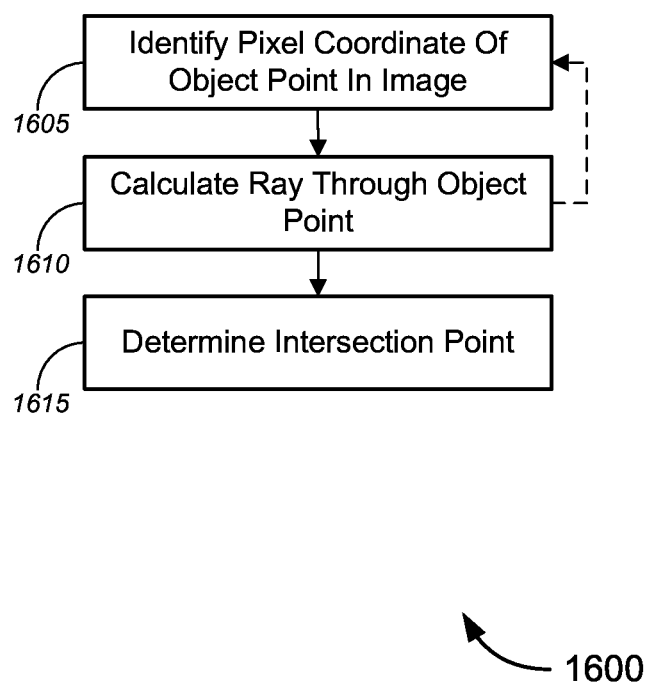

FIG. 16 illustrates a method 1600 that describes one technique to determine the coordinate position of an object point. At block 1605, the method 1600 comprises identifying, in the captured image, a pixel coordinate of the object point in the oriented image. The pixel coordinate might be expressed, e.g., as x,y coordinates (in pixels or any other appropriate unit of measure) from an origin, which might be the bottom-left corner of the image (or any other appropriate origin). Based on the pixel coordinate and the known orientation of the image (and/or the known characteristics of the imaging subsystem), the pixel coordinate can be used to calculate (in three dimensions) a ray (block 1610) passing through (or originating/terminating at) both at the object point and the projection center of the imaging subsystem (or a component thereof) which, again, has a known position, which can be derived from the rover position, as described above.

This process can be repeated for one or more (and, in some cases at least two) reference images that include the object point in their field of view, as illustrated by the broken line on FIG. 16. The pixel coordinate of the intersection point of these calculated rays can be determined mathematically (block 1615), and the pixel coordinate of this intersection point can be used to determine the coordinate position of the intersection point, which represents the position of the object point in three dimensions by reference to a local or global coordinate system. It should be understood of course, that in real-word implementations, the rays rarely will intersect at a coherent point—real-world conditions rarely permit such precision. Instead, a sphere of minimum intersection volume can be calculated. One example of a technique for calculating, with respect to each ray, a line segment representing the closest approach between that ray and another ray; when such lines are calculated for each ray with respect to each other ray, the minimum intersection volume is a volume defined by those line segments. (Of course, it should be noted that other techniques could be used to calculate this volume as well.) The center of this volume (or another location within the volume, depending on weighting factors that can vary according to, e.g., the distance of each capture position from the object of interest, etc.) can be considered the "intersection point" of the rays for purposes of this disclosure. In an aspect, if each of the images is oriented, this process can be performed with two images (e.g., the captured image and one reference image). In another aspect, if the images are not oriented (but the capture positions of the images are known), this process can be performed with three images to provide a position solution for the object point.

It should be noted that a technique similar in principle to the method 1400 can be used to determine the position of a rover from an image captured at that position. In that case, the control system might identify pixel coordinates of three reference points in the image, each of which has a known coordinate position. Three rays, each passing through a different reference point and the projection center, can be calculated; the intersection of these three rays will represent the coordinate position of the projection center; from that coordinate position, the position of the rover can be calculated. If coordinate positions of at least three reference points are known, those reference points can also be used to calculate the orientation of the rover (or, more precisely, the imaging subsystem) when the image is captured, using techniques similar to those described above.

Returning to FIG. 14, other techniques can be used to determine the position of the object point from an oriented image as well. For example, the location of the object point in the image can be used to calculate a ray though the projection center and the object point, as mentioned above, and an EDM system could be used to determine the distance from the rover to the object point. The distance data, coupled with the orientation (e.g., azimuth and tilt) of the ray, can be used to calculate the position of the object point. Other techniques could be used as well. In any event, once the coordinate position of the object point has been determined, that coordinate position can be stored by the control system (block 1425). In one aspect, the coordinate position (which might comprise three-axis coordinates relative to a local or global coordinate system) might be stored in association with an identifier of the object point (which might be descriptive, arbitrary, etc.) to allow later recall of the object point. This data might be stored locally at a data storage device on the rover, transmitted to another device for storage, and/or the like.

Figure 17:
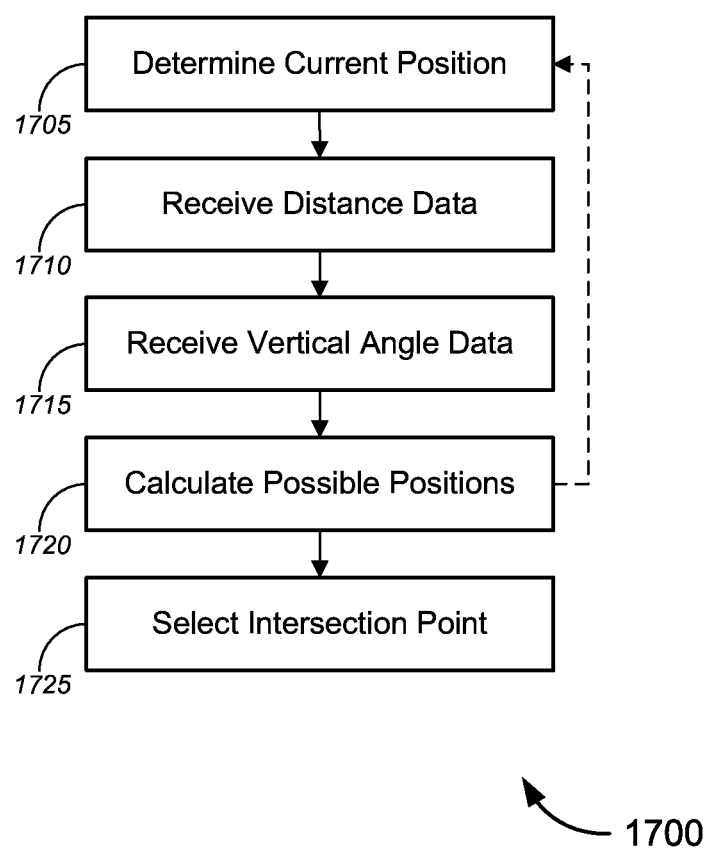

FIG. 17 illustrates a method 1700 embodying another technique that can be used to calculate the position of an object point using rovers in accordance with various embodiments. Merely by way of example, a rover capable of performing the method 1700 might comprise a sensing subsystem having an EDM system with a vertical angle sensor, as described above. (Of course, the rover might include other features as described above, in addition to the EDM system.)

The method 1700 comprises determining a current position of the rover (block 1705), e.g., using any of the techniques described above. At block 1710, the control system receives distance data from the sensing subsystem regarding a measured distance from the rover to the object of interest. At block 1715, the control system receives vertical angle data regarding a vertical angle of the EDM emitter (which might have a vertical angle sensor as described above).

Based on this distance and vertical angle data, a number of techniques may be employed to determine the position of the object point. Merely by way of example, in some embodiments, the distance and vertical angle data can be used to calculate a plurality of possible positions of the object point (block 1720), based on the current position of the rover. (This set of possible positions can be envisioned as a horizontal circle of possible positions centered along a vertical axis passing through the rover's current position, with a radius defined by a horizontal component of the measured distance and an elevation defined by a vertical component of the measured distance, both of which can be calculated trigonometrically from the vertical angle data and the distance data.) These steps can be repeated from multiple stations (or positions) of the rover, resulting in multiple circles of possible positions of the object point—the point(s) of intersection of these circles represent potential positions of the object point.

From these potential positions (intersection points), the actual position of the object point can be selected (block 1725), if necessary. (Merely by way of example, if measurements are taken from only two stations, there will be two intersection points, both of which represent possible positions of the object point.) In such a case, the two possible positions might be displayed on a display screen of the control system, and the user interface might prompt the operator to provide user input to select the appropriate intersection point; the user input might then be received via the user interface (e.g., by the operator pressing a button corresponding to the selected intersection point, by the operator touching the selected intersection point on a touchscreen, etc.). Alternatively and/or additionally, if an azimuth determination device is present, even a rough measurement of azimuth of the EDM system at each station can be used to select the appropriate point automatically. (In some cases, if distance and vertical angle measurements are taken from three or more different stations, there will be only one intersection point of all of the calculated circles, and selection might not be necessary.) In other embodiments, if the azimuth of the EDM system can be determined precisely (using any of a variety of techniques described herein), measurement of distance, tilt and azimuth from a single station can be used to calculate a position of the object point.

Another set of workflows can provide enhanced accuracy and/or precision in measurements through the combination of image analysis technology with surveying best practices. Merely be way of example, the use of a position measurement system capable of capturing panoramic imagery can provide the ability to perform photo-observable backsights and/or check shots, two techniques that surveyors use to ensure accuracy and/or consistency of position measurements. In an aspect, both techniques (which can be used separately or together) employ a correlation between a non-photographic observation of a target point (which can include a variety of target points, object points, and/or reference points, as described above) with a photographic observation of the target point (i.e., captured imagery that includes that target point.)

Figure 18:
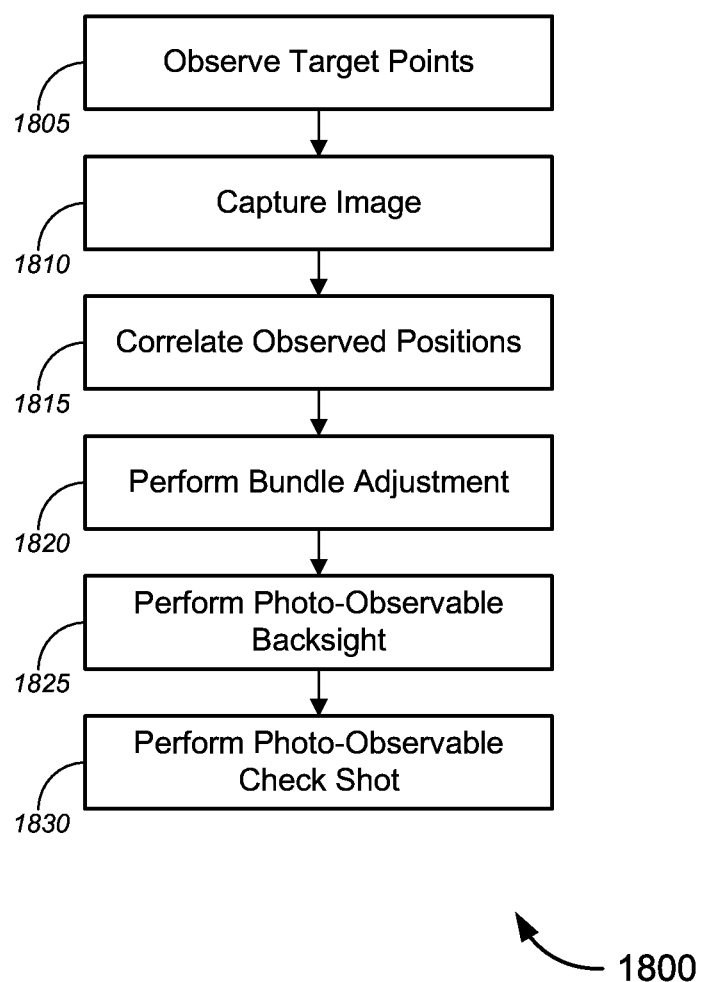

To illustrate an example of these concepts, FIG. 18 illustrates a method 1800 that employs enhanced position determination techniques. In an aspect, the method 1800 can be used to orient an image (or a mosaic of multiple images), for example with respect to a local or global coordinate system, and/or to ensure that such orientation is accurate to within a desired degree of precision. The method 1800 comprises observing positions of one or more target points (block 1805), with respect to a local or global coordinate system (such as those as described above, for example). In an aspect, the observation might be non-photographic, using, for example, a GNSS fix from a rover situated at the target point, optical and/or laser-based position solutions, and/or the like. (Several techniques for observing a position of a target point non-photographically with a rover or other position measurement system are described above, and any such techniques can be used in accordance with various embodiments.

At block 1810, the method 1800 comprises capturing the one or more target points in one or more images observed from one or more stations. In other words, the method 1800 includes capturing image(s), from a single station, or from different stations, that include each of the observed target points in the image(s). So, for example, an operator might situate a rover at a first station, which might be on a target point, and observe the point using a GNSS fix. The operator might then move the rover to a second station and capture an image that includes that target point. Alternatively, the rover might be situated at a first station, which is a known reference point, and the rover might observe another point non-photographically, for example with a conventional optical/laser observation. The rover might then capture an image from that first station, and the captured image might include the observed point. Based on these examples, one skilled in the art will appreciate that any number of techniques can be used (depending on the desired degree of accuracy and/or precision in the observations), so long as the same point or points are observed both photographically and non-photographically.

As noted above, when a rover captures imagery, it often is oriented before capturing the imagery (or the imagery might be oriented later). For example, the rover might take a GNSS fix and an azimuth reading before capturing an image to provide at least a rough orientation for the image. At block 1815, the method can comprise correlating the observed position(s) of each observed target point with the respective pixel location(s) of those target points in the captured images. This might be done on the rover or on an office computer, field computer, etc. that receives the imagery and data from the rover. In some cases, correlation of the observed position with the pixel coordinate of the observed point can be performed automatically by the computer, while in other cases, the computer might receive user input selecting the target point. (For example, if the target point is an optical target, which might be affixed to a case of the rover as an easy optical reference, the computer might be programmed to automatically identify the target point.) Because the imagery might be roughly oriented (as noted above), the search range for the target point can be fairly narrow. The computer can then correlate that pixel coordinate in the image with the actual location (e.g., a coordinate location in the local or global coordinate system), for example, by defining a particular latitude/longitude/elevation coordinate pair to a particular pixel in each of the images.

This coordination can then be used in different ways to ensure the fidelity of the image orientation to the real-world coordinate system in use. For example, the method 1800 can comprise using the correlation of the observed position with the pixel coordinate location of the target point in the image(s) performing a bundle adjustment calculation to orient the image (or a mosaic of multiple images), for example by using techniques familiar to those known in the art, such as those described in the Incorporated Applications.

Certain embodiments, however, provide an enhancement over conventional bundle adjustment techniques, because they can use the known relationship between a pixel coordinate in an image and an observed position. For example, in some cases, the method 1800 can include performing a photo-observable backsight in performing the bundle adjustment calculation (block 1825). In a set of embodiments, a computer system can perform an operation analogous to a backsight in traditional surveying practice, by constraining a target point to its observed position when performing the bundle adjustment calculation. In other words, when performing the calculation, the computer will force the pixel coordinate of the target point in the oriented image (or each of he pixel coordinates of the target point in a plurality of images when generating/orienting a mosaic of the images) to correspond (to whatever degree of precision is appropriate and/or desired) to the observed position of that point with reference to a real-world coordinate system. By performing this backsight technique on a plurality of points in an image (or mosaic), the system can provide a much more accurate and/or precise orientation of the image/mosaic than an orientation that depends only on the orientation of the camera that took the images (as conventional technique provides).

Another technique that can employ the correlation between the known position of a target point and a pixel coordinate of that target point in an image (or mosaic of images) is to perform a photo-observable check shot (block 1830). This technique is analogous to another best practice in traditional surveying, a check shot, in which a position measurement device at a observed station is used to measure the position of a known reference point to ensure that the observation of the station is correct. In the method 1800, the computer system, after performing a bundle adjustment to orient an image or mosaic, can determine the position of a target point in the oriented image/mosaic and compare that determined position with the non-photographically observed position of the same target point. If the positions match, to within whatever degree of precision is desired or appropriate, that match can be used to verify the accuracy of the bundle adjustment calculation and/or the resulting orientation of the image/mosaic.

In certain embodiments, the photo-observable backsight and the photo-observable check shot can be used independently. In other embodiments, however, the computer system can use both techniques in complementary fashion. For example, the operator might have non-photographically observed three target points in the field. Two of those target points can be used to perform a photo-observable backsight to constrain the bundle adjustment calculation, and the third target point can be used to perform a photo-observable check shot to verify the accuracy of the constrained bundle adjustment calculation.

It should be appreciated that any number of target points can be used in such techniques, and that a greater number of target points can result in further refinement of the bundle adjustment solution. The nature of the target points is not material, so long as each target point is something that can be observed non-photographically and can also be captured in an image for photo observation. Examples can include the different types of object points described herein, including specifically, optical targets placed on the ground, on a pole, or affixed to a structure, such as a case for the rover. Other examples can include natural geographical features and/or manmade geographical features. Notably, the actual position of the target point can be arbitrary (e.g., a rover case placed anywhere on the ground), so long as the target point can be observed non-photographically and photographically while in the same position.

Further Exemplary Implementations

The following implementations describe various combinations of features that can be provided by certain embodiments. As with the description above, these exemplary implementations are provided for purposes of illustration only and should not be considered limiting in any respect.

A position measurement system, comprising: a rod having a base, the rod being configured to be disposed with the base substantially in contact with a ground surface and a longitudinal axis in a substantially vertical position; and a sensing subsystem coupled with the rod, the sensing subsystem comprising: a global navigation satellite system ("GNSS") device for obtaining GNSS data; an azimuth determination device for determining an azimuth from the position measurement system to an object of interest; a tilt sensor for obtaining tilt data about a tilt angle of the position measurement system; and a data storage device for storing data obtained by the sensing subsystem.

A position measurement system, such as one described above, wherein the azimuth determination device determines an azimuth of tilt of the position measurement system.

A position measurement system, such as one described above, further comprising an electronic display in communication with the tilt sensor, the electronic display simulating a bullseye spirit bubble, the electronic display displaying a bubble image and a ring image, with the relative position of the bubble and the ring being based on the tilt data.

A position measurement system, such as one described above, wherein the size of the bubble image relative to the size of the ring image is dependent on quality of the azimuth.

A position measurement system, comprising: a rod having a base, the rod being configured to be disposed with the base substantially in contact with a ground surface and a longitudinal axis in a substantially vertical position; an imaging subsystem coupled with the rod, the imaging subsystem comprising a plurality of cameras, to capture an image of at least a portion of a landscape surrounding the position measurement system; and a control system in communication with the imaging subsystem, the control system comprising a processor and a computer readable medium having encoded thereon a set of instructions executable by the processor to cause the control system to perform one or more operations, the set of instructions comprising: instructions to determine a position of the position measurement system; instructions to receive an image from the imaging subsystem; instructions to orient the received image with regard to a frame of reference, based at least in part on the position of the position measurement system; instructions to determine a coordinate position of an object point using the received image; and instructions to store the determined coordinate position of the object point.

A position measurement system, such as one described above, wherein the instructions to orient the image comprise: instructions to analyze a plurality of reference images, each of the reference images having been captured from a different position than the position of the position measurement system, each of the reference images having at least a portion of a field of view in common with a field of view of the received image; instructions to identify one or more common reference points in the one or more reference images; instructions to identify the one or more reference points in the received image; and instructions to calculate a tilt and azimuth of the received image, based on locations of the one or more reference points in the received image.

A position measurement system, such as one described above, wherein the one or more reference points comprise three or more tie points without known locations, and wherein the one or more reference images are captured from known positions.

A position measurement system, such as one described above, wherein the one or more reference points comprise a back sight point having a known position.

A position measurement system, such as one described above, wherein the instructions to determine a coordinate position of an object point comprise: instructions to identify a first pixel coordinate of the object point in the received image captured at the determined position of the position measurement system; instructions to identify a second pixel coordinate of the object point in a reference image captured at a second, known position of the position measurement system, the second position being a different position than the determined position of the position measurement system; instructions to calculate a first ray from the first pixel coordinate though a projection center of the imaging subsystem; instructions to calculate a second ray from the second pixel coordinate though the projection center of the imaging subsystem; and instructions to determine a coordinate of an intersection point of the first ray and the second ray.

A position measurement system, such as one described above, wherein the reference image has a known orientation.

A position measurement system, such as one described above, wherein: the reference image is a first reference image; the instructions to determine a coordinate position of the object point further comprise: instructions to identify a third pixel coordinate of the object point in a second reference image captured at a third, known position of the position measurement system, the third position being a different position than the determined position of the position measurement system and the second position of the position measurement system; and instructions to calculate a third ray from the third pixel coordinate though a projection center of the imaging subsystem; the instructions to determine a coordinate of an intersection point comprise instructions to determine a coordinate of an intersection point of the first ray, the second ray, and the third ray; and the orientations of the first reference image and the second reference image are not known.

A position measurement system, such as one described above, further comprising a sensing subsystem, wherein the instructions to orient the received image comprise instructions to orient the received image based at least in part on data received from the sensing subsystem.

A position measurement system, such as one described above, wherein the sensing subsystem comprises a tilt sensor and an azimuth determination device, and wherein the data received from the sensing subsystem comprises azimuth data regarding an azimuth of the imaging subsystem and tilt data regarding a vertical angle of the rod.

A position measurement system, such as one described above, wherein the instructions to orient the received image comprise: instructions to analyze one or more reference images, each of the one or more reference images having been captured from a different location than the position of the position measurement system, each of the reference images having at least portion of a field of view in common with a field of view of the received image; instructions to identify one or more common reference points in the one or more reference images; instructions to identify the one or more reference points in the received image; instructions to calculate an azimuth of the received image, based on locations of the one or more reference points in the received image; and instructions to calculate a tilt of the received image based at least in part on the tilt data.

A position measurement system, such as one described above, wherein the instructions to determine a coordinate position of an object point comprise: instructions to identify a first pixel coordinate of the object point in the received image captured at the determined position measurement system; instructions to identify a second pixel coordinate of the object point in a reference image captured at a second, known position of the position measurement device, the second position being a different position than the determined position of the position measurement system; instructions to calculate a first ray from the first pixel coordinate though a projection center of the imaging subsystem; instructions to calculate a second ray from the second pixel coordinate though the projection center of the imaging subsystem; and instructions to determine an intersection point of the first ray and the second ray.

A position measurement system, such as one described above, wherein the instructions to determine a position of the position measurement system comprise: instructions to identify a first pixel coordinate of a first reference point captured in the received image, the first reference point having a known position; instructions to identify a second pixel coordinate of a second reference point captured in the received image, the second reference point having a known position; instructions to identify a third pixel coordinate of a third reference point captured in the received image, the third reference point having a known coordinate position; instructions to calculate a first ray from the first pixel coordinate through a projection center of the imaging subsystem; instructions to calculate a second ray from the second pixel coordinate through a projection center of the imaging subsystem; instructions to calculate a third ray from the third pixel coordinate through a projection center of the imaging subsystem; and instructions to determine an intersection point of the first ray, the second ray, and the third ray.

A position measurement system, such as one described above, wherein the sensing subsystem comprises a position determination device, and wherein the data received from the sensing subsystem comprises position data regarding a position of the position measurement system.

A position measurement system, such as one described above, wherein the position data specifies a position of an upper portion of the rod, wherein the sensing subsystem further comprises a tilt sensor that provides vertical angle data regarding a vertical angle of the rod and an azimuth determination device that provides tilt azimuth data regarding an azimuth of tilt of the rod, and wherein the instructions to determine a position of the position measurement system comprise: instructions to receive the position data; and instructions to calculate a position of the base of the rod based on the position data, a known distance from the upper portion to the base of the rod, the vertical angle data and the tilt azimuth data.

A position measurement system, such as one described above, wherein the position determination device comprises a global navigation satellite system ("GNSS") receiver.

A position measurement system, such as one described above, wherein the position determination device comprises user interface for an operator to provide user input indicating a position of the position measurement system.

A position measurement system, such as one described above, wherein the position determination device comprises a radio for receiving position data from a total station.

A position measurement system, such as one described above, wherein the position determination device further comprises an optical target configured to reflect a beam of light emitted from the total station.

A position measurement system, such as one described above, wherein the position determination device comprises an electronic distance measurement ("EDM") system and an azimuth determination device, and wherein the position data comprises distance data regarding a distance to a known reference point and azimuth data to the known reference point.

A position measurement system, such as one described above, wherein the imaging subsystem further comprises a plurality of illumination devices.

A position measurement system, comprising: a rod having a base, the rod being configured to be disposed with the base substantially in contact with a ground surface and a longitudinal axis in a substantially vertical position; a sensing subsystem comprising an electronic distance measurement ("EDM") system, the EDM system comprising an emitter, the sensing subsystem further comprising a vertical angle sensor that determines a vertical angle of the emitter; and a control system in communication with the sensing subsystem, the control system comprising a processor and a computer readable medium having encoded thereon a set of instructions executable by the processor to cause the control system to perform one or more operations, the set of instructions comprising: instructions to determine a position of the position measurement system; instructions to receive, from the sensing subsystem, distance data regarding a measured distance from the position measurement system to an object of interest; instructions to receive, from the sensing subsystem, vertical angle data regarding a vertical angle of the emitter; instructions to determine a position of the object of interest, based at least in part on the position of the position measurement system, the distance data, and the vertical angle data.

A position measurement system, such as one described above, wherein: the sensing subsystem further comprises an azimuth determination device that determines an azimuth from the position measurement system to the object of interest; and the instructions to determine a position of the object of interest comprise instructions to determine a position of the object of interest based on the distance data, the vertical angle data, and the azimuth.

A position measurement system, such as one described above, wherein: the instructions to receive distance data comprise instructions to receive first distance data regarding a first measured distance from the position measurement system at a first station to the object of interest and instructions to receive second distance data regarding a second measured distance from the position measurement system at a second station to the object of interest; the instructions to receive vertical angle data comprise instructions to receive first vertical angle data regarding a first vertical angle of the emitter at the first station and instructions to receive second vertical angle data regarding a second vertical angle of the emitter at the second station.

A position measurement system, such as one described above, further comprising a display device, and wherein the instructions to determine a position of the object of interest comprise: instructions to display, with the display device, a plurality of calculated possible positions of the object of interest; and instructions to receive user input specifying which of the plurality of calculated possible positions of the object of interest should be selected as the position of the object of interest.

A position measurement system, such as one described above, further comprising an azimuth determination device, and wherein the instructions to determine a position of the object of interest comprise instructions to select, from among a plurality of calculated possible positions of the object of interest, a selected position of the object of interest, based at least in part on azimuth data received from the azimuth determination device.

A position measurement system, such as one described above, further comprising a support device, the support device comprising a first end portion coupled with the rod and a second end portion extendable laterally from the base of the rod, for supporting the position measurement system in a generally vertical orientation.

A position measurement system, such as one described above, wherein the support device enhances the rotational stability of the rod to facilitate focusing the beam of light on the object point.

A position measurement system, such as one described above, wherein the first end portion of the support device comprises a sleeve that encloses a circumferential perimeter of a portion of the rod, the sleeve being in mechanical communication with the portion of a rod through a high-viscosity material that imposes rotational friction between the sleeve and the portion of the rod.

A position measurement system, such as one described above, wherein the first end portion is configured to move along an axis of the rod, allowing the rod to be tilted while the second end portion maintains contact with the ground.

A position measurement system, such as one described above, wherein the EDM system is rotatable about an axis normal to the longitudinal axis of the rod, and wherein the emitter is eccentric to the normal rotational axis of the EDM system, such that the emitter can be rotated to point downward and upward parallel to the longitudinal axis of the rod.

A position measurement system, such as one described above, wherein the EDM system comprises a vertical angle encoder that detects an angle of the emitter relative to the longitudinal axis of the rod, wherein the sensing subsystem further comprises a tilt sensor that produces tilt data regarding a tilt of the rod, and wherein the vertical angle sensor comprises the vertical angle encoder and the tilt sensor, such that the vertical angle data comprises a combination of (i) the angle of the emitter relative to the longitudinal axis of the rod and (ii) the tilt data.

A position measurement system, such as one described above, wherein the EDM system includes a camera to facilitate aiming the emitter at the object point.

A position measurement system, comprising: a rod having a base, the rod being configured to be disposed with the base substantially in contact with a ground surface and a longitudinal axis in a substantially vertical position; a sensing subsystem coupled with the rod, the sensing subsystem comprising: a global navigation satellite system ("GNSS") device for obtaining GNSS data; an azimuth determination device for determining an azimuth from the position measurement system to an object of interest; a tilt sensor for obtaining tilt data about a tilt angle of the position measurement system; and a data storage device for storing data obtained by the sensing subsystem; and an imaging subsystem, comprising a plurality of cameras, to capture an image of at least a portion of a landscape surrounding the position measurement system.

A position measurement system, such as one described above, wherein the azimuth determination device comprises a compass for obtaining compass orientation data about the position measurement system.

A position measurement system, such as one described above, wherein the azimuth determination device further comprises a gyroscope for obtaining gyroscopic orientation data about the position measurement system.

A position measurement system, such as one described above, wherein the gyroscope is used to perform error correction on the compass orientation data.

A position measurement system, comprising: a rod having a base, the rod being configured to be disposed with the base substantially in contact with a ground surface and a longitudinal axis in a substantially vertical position; a sensing subsystem coupled with the rod, the sensing subsystem comprising: a global navigation satellite system ("GNSS") device for obtaining GNSS data; a compass for obtaining compass orientation data about the position measurement system; a tilt sensor for obtaining tilt data about a tilt angle of the position measurement system; a gyroscope for obtaining gyroscopic data about a relative orientation of the position measurement system; a data storage device for storing data obtained by the sensing subsystem; and a first communication interface; and a control subsystem in communication with the sensing subsystem, the control system comprising: a second communication interface for communicating with the first communication interface; a display device; an input device; a processor; and a computer readable storage medium having encoded thereon a set of instructions executable by the processor to cause the position measurement system to perform one or more operations.

A position measurement system, such as one described above, wherein the set of instructions comprises: instructions for establishing communication between the second communication interface and the first communication interface; instructions for receiving, from the sensing subsystem, GNSS data, compass orientation data, tilt data, and gyroscopic data; instructions for calculating a true compass azimuth to the target object, based at least in part on the compass orientation data; instructions for calculating a gyroscopic azimuth to the target object, based at least in part on the gyroscopic data; instructions for selecting a preferred azimuth to the target object, based at least in part on the true compass azimuth and the gyroscopic azimuth; instructions for adjusting the preferred azimuth, based at least in part on the tilt data, to produce a selected azimuth; and instructions for displaying, on the display device, information about the selected azimuth.

A position measurement system, such as one described above, wherein the rod has a longitudinal length of between approximately 1.5 and approximately 3.0 meters.

A position measurement system, such as one described above, wherein the control subsystem is removably coupled with the rod.

A position measurement system, such as one described above, wherein the display device comprises a touch screen.

A position measurement system, such as one described above, wherein the input device comprises the touch screen.

A position measurement system, such as one described above, further comprising: a prism movably coupled with the rod to allow the prism to be moved along at least a portion of the longitudinal axis of the rod.

A position measurement system, such as one described above, further comprising: an image capture subsystem coupled with the rod, and in communication with the control subsystem, the image capture subsystem comprising one or more image capture devices.

A position measurement system, such as one described above, wherein the GNSS device is coaxial with the image capture subsystem.

A position measurement system, such as one described above, wherein the image capture subsystem comprises a plurality of cameras collectively having a panoramic field of view of at least about 50 degrees.

A position measurement system, such as one described above, wherein the plurality of cameras collectively have a panoramic field of view of at least about 170 degrees.

A position measurement system, such as one described above, wherein the plurality of cameras collectively have a panoramic field of view of at least about 350 degrees.

A position measurement system, such as one described above, wherein the plurality of cameras collectively have a panoramic field of view of about 360 degrees.

A position measurement system, such as one described above, wherein the plurality of cameras comprises a first set of cameras and a second set of cameras.

A position measurement system, such as one described above, wherein the first set of cameras comprises seven cameras collectively having a panoramic field of view of 360 degrees and a vertical field of view starting on the ground approximately five meters from the base of the position measurement device and extending to approximately twenty degrees above the horizon to cover vertical objects.

A position measurement system, such as one described above, wherein the second set of cameras comprises five cameras having a panoramic field of view of approximately 180 degrees and a field of view of the ground surface extending from approximately 0.6 meters to approximately six meters from the base of the position sensing device.

A position measurement system, such as one described above, wherein the set of instructions further comprises: instructions to display, on the display screen, a plan view of a job site, the plan view illustrating areas of photogrammetric coverage of which one or more images have been captured.

A position measurement system, such as one described above, wherein the set of instructions further comprises: instructions to display, on the display screen, an overlay depicting a strength of photogrammetric coverage of one or more regions of the job site.

A position measurement system, such as one described above, wherein the set of instructions comprises: instructions for displaying, on the display screen, an image captured by one or more of the plurality of cameras.

A position measurement system, such as one described above, wherein the set of instructions further comprises: instructions to receive input selecting a point in the captured image as a target point.

A position measurement system, such as one described above, wherein the target point is an object point or a reference point.

A position measurement system, such as one described above, wherein display device comprises a touch screen, and wherein the input comprises input selecting a portion of the touch screen corresponding to the point in the captured image.

A position measurement system, such as one described above, further comprising: an electronic distance measurement ("EDM") subsystem coupled with the rod and in communication with the control system; and a vertical angle sensor configured to determine a vertical angle of the EDM subsystem.

A position measurement system, such as one described above, wherein the set of instructions further comprises: instructions to calculate an azimuth to the target point from the position measurement system; instructions to receive vertical angle data from the vertical angle sensor; instructions to operate the EDM subsystem to measure a distance to the target point from the position measurement system; and instructions to calculate a position of the target point, based at least in part on the azimuth, the vertical angle data, and the distance to the target point.

A position measurement system, such as one described above, wherein the first and second communication interfaces are wireless communication interfaces.

A position measurement system, such as one described above, wherein the first and second communication interfaces each comprise a wireless communication device selected from the group consisting of a Bluetooth transceiver, a wireless local area network ("WLAN") radio, a cellular radio, and a wireless wide area network ("WWAN") radio.

A method comprising: situating a position measurement system at a chosen location, the position measurement system comprising: a rod having a base, the rod being configured to be disposed with the base substantially in contact with a ground surface and a longitudinal axis in a substantially vertical position; a sensing subsystem coupled with the rod, the sensing subsystem comprising: a global navigation satellite system ("GNSS") device for obtaining GNSS data; a compass for obtaining compass orientation data about the position measurement system; a tilt sensor for obtaining tilt data about a tilt angle of the position measurement system; a gyroscope for obtaining gyroscopic data about a relative orientation of the position measurement system; and a data storage device for storing data obtained by the sensing subsystem; and a control subsystem, in communication with the sensing subsystem, for controlling operation of the sensing subsystem; establishing communication between the control subsystem and the sensing subsystem; receiving, from the sensing subsystem, GNSS data, compass orientation data, tilt data, and gyroscopic data; calculating a true compass azimuth to the target object, based at least in part on the compass orientation data; calculating a gyroscopic azimuth to the target object, based at least in part on the gyroscopic data; selecting a preferred azimuth to the target object, based at least in part on the true compass azimuth and the gyroscopic azimuth; adjusting the preferred azimuth, based at least in part on the tilt data, to produce a selected azimuth; and displaying, on the display device, information about the selected azimuth.

A method, such as one described above, further comprising: calibrating the position measurement system.

An apparatus, comprising: a non-transitory computer readable medium having encoded thereon a set of instructions executable by one or more processors to cause a computer system to perform one or more operations, the set of instructions comprising: instructions for establishing communication between the computer system and a sensing subsystem of a position measurement system; instructions for receiving, from the sensing subsystem, GNSS data, compass orientation data, tilt data, and gyroscopic data; instructions for calculating a true compass azimuth to the target object, based at least in part on the compass orientation data; instructions for calculating a gyroscopic azimuth to the target object, based at least in part on the gyroscopic data; instructions for selecting a preferred azimuth to the target object, based at least in part on the true compass azimuth and the gyroscopic azimuth; instructions for adjusting the preferred azimuth, based at least in part on the tilt data, to produce a selected azimuth; and instructions for causing the display, on a display device, of information about the selected azimuth.

CONCLUSION

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   observing, with a position measurement device, a position of a first target point non-photographically, with respect to a local or global coordinate system;
   observing, with the position measurement device, a position of a second target point non-photographically, with respect to the local or global coordinate system;
   capturing, with an imaging device, the first and second target points in one or more images observed from one or more stations;
   correlating, with a computer, the observed position of the first target point with a pixel coordinate location of the first target point in each of the one or more images;
   correlating, with the computer, the observed position of the second target point with a pixel coordinate location of the second target point in each of the one or more images;
   performing, with the computer, a bundle adjustment calculation to orient a mosaic of images comprising the one or more images, wherein performing the bundle adjustment calculation comprises performing a photo-observable backsight by constraining the pixel coordinate location of the first target point in the oriented mosaic of images to the observed position of the first target point with respect to the local or global coordinate system to within a specified precision; and
   performing, with the computer, a photo-observable check shot by comparing a location of the second target point in the oriented mosaic of images with the observed position of the second target point with respect to the local or global coordinate system, to ensure that the oriented mosaic of images corresponds to the local or global coordinate system to within a specified precision.

2. A system, comprising:
   a computer comprising a processor and a non-transitory computer readable medium having stored thereon a set of instructions executable by the processor to perform one or more operations, the set of instructions comprising:
      instructions to receive data indicating an observed position of a target point, with respect to a local or global coordinate system;
      instructions to receive a plurality of images comprising one or more images that include the target point;
      instructions to correlate the observed position of the target point with a location of the target point in each of the one or more images; and
      instructions to use a correlation of the observed position of the target point with the location of the target point in each of the one or more images to perform a bundle adjustment calculation that orients a mosaic of images comprising the plurality of images, wherein using a correlation of the observed position of the target point with the location of the target point in each of the one or more images comprises performing a photo-observable backsight by constraining the location of the target point in the oriented mosaic of images to the observed position of the target point with respect to the local or global coordinate system to within a specified precision.

3. The system of claim 2, wherein using a correlation of the observed position of the target point with the location of the target point in each of the one or more images comprises performing a photo-observable check shot by comparing a location of the target point in the oriented mosaic of images with the observed position of the target point with respect to the local or global coordinate system, to ensure that the oriented mosaic of images corresponds to the local or global coordinate system to within a specified precision.

4. The system of claim 2, wherein:
the instructions to receive data indicating the observed position of the target point comprise instructions the receive data indicating observed positions of a plurality of target points;
the instructions to correlate the observed position of the target point with a location of the target point in each of the one or more images comprise instructions to correlate the observed position of each of the target points with respective locations of each of the target points in one or more of the images; and
the instructions to use a correlation of the observed position of the target point with the location of the target point in each of the one or more images to perform a bundle adjustment calculation comprise instructions to use correlations of the observed positions of each of the target points in one or more of the images to perform the bundle adjustment calculation.

5. The system of claim 4, wherein the instructions to use correlations of the observed positions of each of the target points in one or more of the images to perform the bundle adjustment calculation comprise instructions to use a first target point to perform a photo-observable backsight and instructions to use a second target point to perform a photo-observable check shot.

6. The system of claim 5, wherein the instructions to use correlations of the observed positions of each of the target points in one or more of the images to perform the bundle adjustment calculation comprise instructions to use a third target point to perform a second photo-observable backsight.

7. The system of claim 5, wherein the instructions to use correlations of the observed positions of each of the target points in one or more of the images to perform the bundle adjustment calculation comprise instructions to use a third target point to perform a second photo-observable check shot.

8. The system of claim 2, further comprising:
a position measurement device that observes the position of the target point, with respect to the global or local coordinate system; and
an imaging device that captures the target point in the one or more images observed from one or more stations.

9. The system of claim 8, wherein the position measurement system observes the position of the target point non-photographically.

10. The system of claim 8, wherein the position measurement device observes the position of the target point using a total station.

11. The system of claim 8, wherein the position measurement device observes the position of the target point using a laser range finding device.

12. The system of claim 8, wherein the position measurement device observes the position of the target point using a GNSS receiver.

13. The system of claim 8, wherein the position measurement device and the imaging device are incorporated within a position measurement system.

14. The system of claim 13, wherein the position measurement system further comprises:
a rod having a base, the rod being configured to be disposed with the base substantially in contact with a ground surface and a longitudinal axis in a substantially vertical position;
a tilt sensor;
a second processor in communication with the position measurement device and the tilt sensor; and
a second non-transitory computer readable medium having encoded thereon a second set of instructions executable by the second processor to cause the position measurement system to perform one or more operations, the second set of instructions comprising:
instructions to receive tilt data from the tilt sensor, the tilt data indicating a tilt angle of the rod;
instructions to determine, based on the tilt data, that a tilt of the rod is within a specified tolerance from the vertical position; and
instructions to capture position data to observe the position of the target point, using the position measurement device, about a position of the position measurement system, when the tilt of the rod is determined to be within the specified tolerance from the vertical position.

15. The system of claim 2, wherein the target point is an optical target.

16. The system of claim 15, wherein the optical target is affixed to a case of a position measurement device.

17. The system of claim 2, wherein the target point is a natural or manmade geographic feature.

18. The system of claim 2, wherein the location of the target point in each of the one or more images is a pixel coordinate location of the target point in each of the one or more images.

19. An apparatus, comprising:
a non-transitory computer readable medium having encoded thereon a set of instructions executable by one or more computers to perform one or more operations, the set of instructions comprising:
instructions to receive, from a position measurement device, data indicating an observed position of a target point;
instructions to receive a plurality of images comprising one or more images that include a photographic observation of the target point;
instructions to correlate the observed position of the target point with a location of the target point in each of the one or more images; and
instructions to use a correlation of the observed position of the target point with the location of the target point in each of the one or more images to perform a bundle adjustment calculation that orients a mosaic of images comprising the plurality of images, wherein using a correlation of the observed position of the target point with the location of the target point in each of the one or more images comprises performing a photo-observable backsight by constraining a pixel coordinate location of the target point in the oriented mosaic of images to the observed position of the target point with respect to the local or global coordinate system to within a specified precision.

* * * * *